(12) United States Patent
Amaro

(10) Patent No.: US 9,210,155 B2
(45) Date of Patent: Dec. 8, 2015

(54) SYSTEM AND METHOD OF EXTENDING A HOST WEBSITE

(71) Applicant: Stocktree Inc., Toronto (CA)

(72) Inventor: Brian Amaro, Toronto (CA)

(73) Assignee: Stocktree Inc., Toronto (CA)

( * ) Notice: Subject to any disclaimer, the term of this patent is extended or adjusted under 35 U.S.C. 154(b) by 157 days.

(21) Appl. No.: 14/196,422

(22) Filed: Mar. 4, 2014

(65) Prior Publication Data
US 2014/0298443 A1 Oct. 2, 2014

Related U.S. Application Data

(60) Provisional application No. 61/774,908, filed on Mar. 8, 2013.

(51) Int. Cl.
*H04L 29/06* (2006.01)
*H04L 29/08* (2006.01)

(52) U.S. Cl.
CPC ............... *H04L 63/08* (2013.01); *H04L 63/10* (2013.01); *H04L 67/141* (2013.01); *H04L 67/14* (2013.01)

(58) Field of Classification Search
CPC .......... H04L 63/10; H04L 63/08; H04L 67/14
See application file for complete search history.

(56) References Cited

U.S. PATENT DOCUMENTS

| | | | | |
|---|---|---|---|---|
| 5,933,645 A * | 8/1999 | Wallack | .................. | G06F 9/542 707/999.001 |
| 7,673,135 B2 * | 3/2010 | Chin | .................. | H04L 63/0807 713/159 |
| 7,814,484 B2 * | 10/2010 | Griffith | .................. | G06F 9/445 709/220 |
| 7,895,445 B1 * | 2/2011 | Albanese | .............. | G06F 21/335 713/172 |
| 8,856,205 B2 * | 10/2014 | Tian | ......................... | H04L 67/02 709/203 |
| 8,909,826 B2 * | 12/2014 | Park | ....................... | G06F 13/126 710/37 |
| 8,935,755 B1 * | 1/2015 | Kay | .......................... | G06F 8/61 726/1 |
| 9,118,648 B2 * | 8/2015 | Gonzalez Martinez | ............. | H04L 63/0884 |
| 2006/0143264 A1 | 6/2006 | Payne et al. | | |
| 2008/0178270 A1 * | 7/2008 | Buss | ....................... | G06F 21/31 726/5 |
| 2008/0178284 A1 * | 7/2008 | Harwell | .................. | G06F 21/10 726/21 |
| 2008/0256002 A1 | 10/2008 | Yoshida et al. | | |
| 2008/0270312 A1 * | 10/2008 | Ohata | .................... | G06Q 10/10 705/76 |

(Continued)

FOREIGN PATENT DOCUMENTS

WO    WO03046678 A2    6/2003
WO    WO2007001873 A2    1/2007

*Primary Examiner* — Kaveh Abrishamkar
*Assistant Examiner* — James J Wilcox
(74) *Attorney, Agent, or Firm* — Bereskin & Parr LLP/S.E.N.C.R.L., s.r.l.

(57) ABSTRACT

Some embodiments of the present disclosure provide a system for providing access control. The system may include an extension module for extending a host website; and a marketplace server that is configured to: receive a request to access the extension module from a browsing device, the browsing device is for maintaining a browsing session with the host website, and the extension module is for exchanging data with the host website; generate a first authorization token that is associated with the browsing session; and send, to the browsing device, the first authorization token. The extension module may be configured to receive a second authorization token from the browsing device. One of the extension module or the marketplace server may then be further configured to: verify that the second authorization token matches the first authorization token; and if verification is successful, the extension module can be allowed to exchange data with the host website and communicate with the browsing device.

15 Claims, 22 Drawing Sheets

(56) References Cited

U.S. PATENT DOCUMENTS

| | | |
|---|---|---|
| 2009/0070412 A1 | 3/2009 | D'Angelo et al. |
| 2009/0076916 A1 | 3/2009 | Kim et al. |
| 2009/0099922 A1 | 4/2009 | Paradies |
| 2009/0254978 A1* | 10/2009 | Rouskov ............... G06F 21/335 726/4 |
| 2010/0241500 A1 | 9/2010 | Milone |
| 2011/0055731 A1* | 3/2011 | Echenberg ............. G06F 9/445 715/756 |
| 2011/0265159 A1* | 10/2011 | Ronda ................ H04L 63/0853 726/6 |
| 2011/0283366 A1* | 11/2011 | Kwon .................... G06F 21/54 726/29 |
| 2011/0302646 A1* | 12/2011 | Ronda ................... H04L 9/3213 726/9 |
| 2012/0015724 A1 | 1/2012 | Ocko et al. |
| 2012/0041842 A1 | 2/2012 | Adelman et al. |
| 2012/0151329 A1 | 6/2012 | Cordasco |
| 2013/0055114 A1* | 2/2013 | Lev ....................... H04W 4/001 715/760 |
| 2013/0117816 A1* | 5/2013 | Dittrich ............... H04L 63/0807 726/4 |
| 2013/0219190 A1* | 8/2013 | Selig .................... H04L 63/108 713/189 |
| 2014/0283092 A1* | 9/2014 | Mowatt ................ G06F 21/105 726/26 |

\* cited by examiner

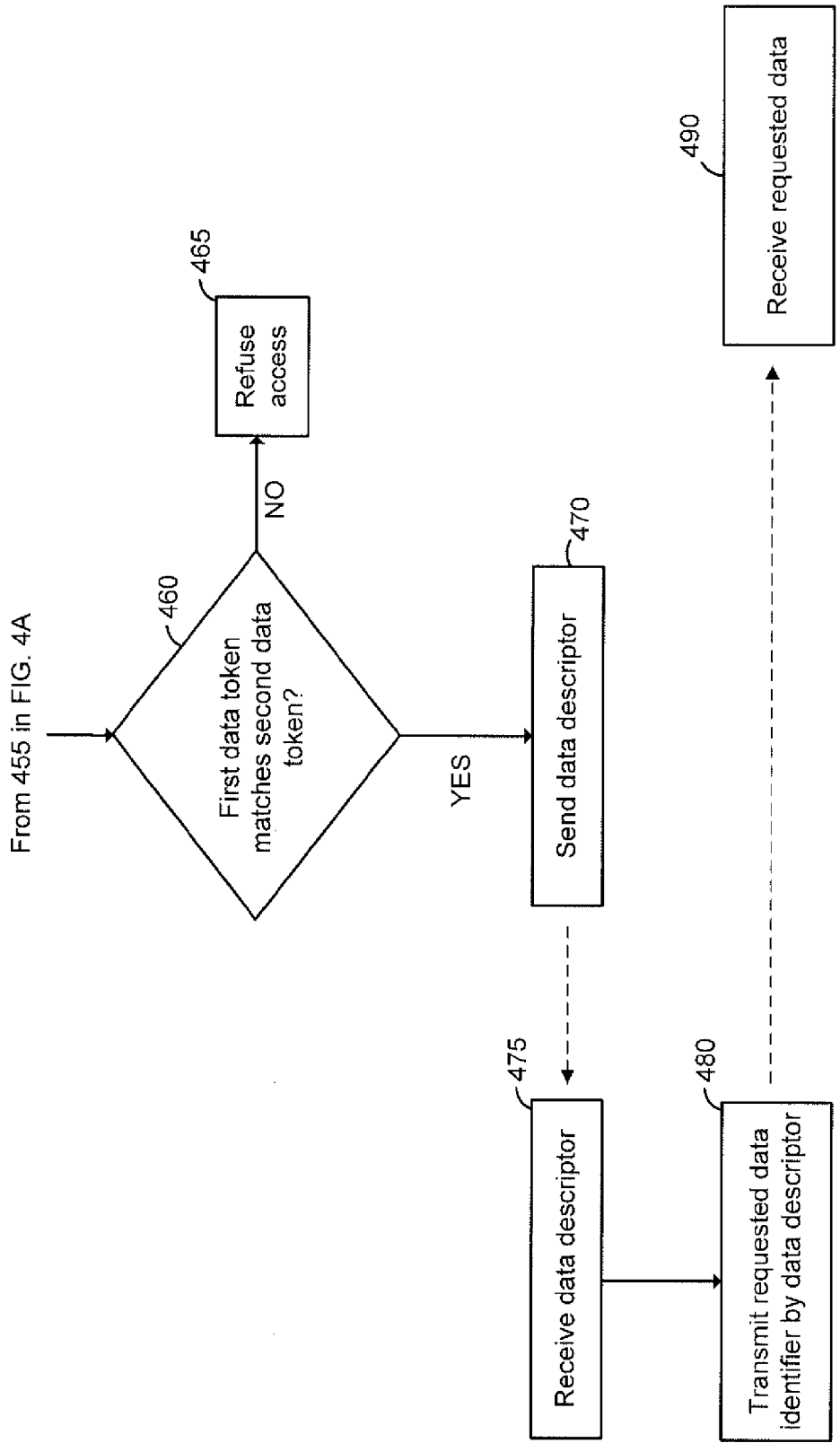

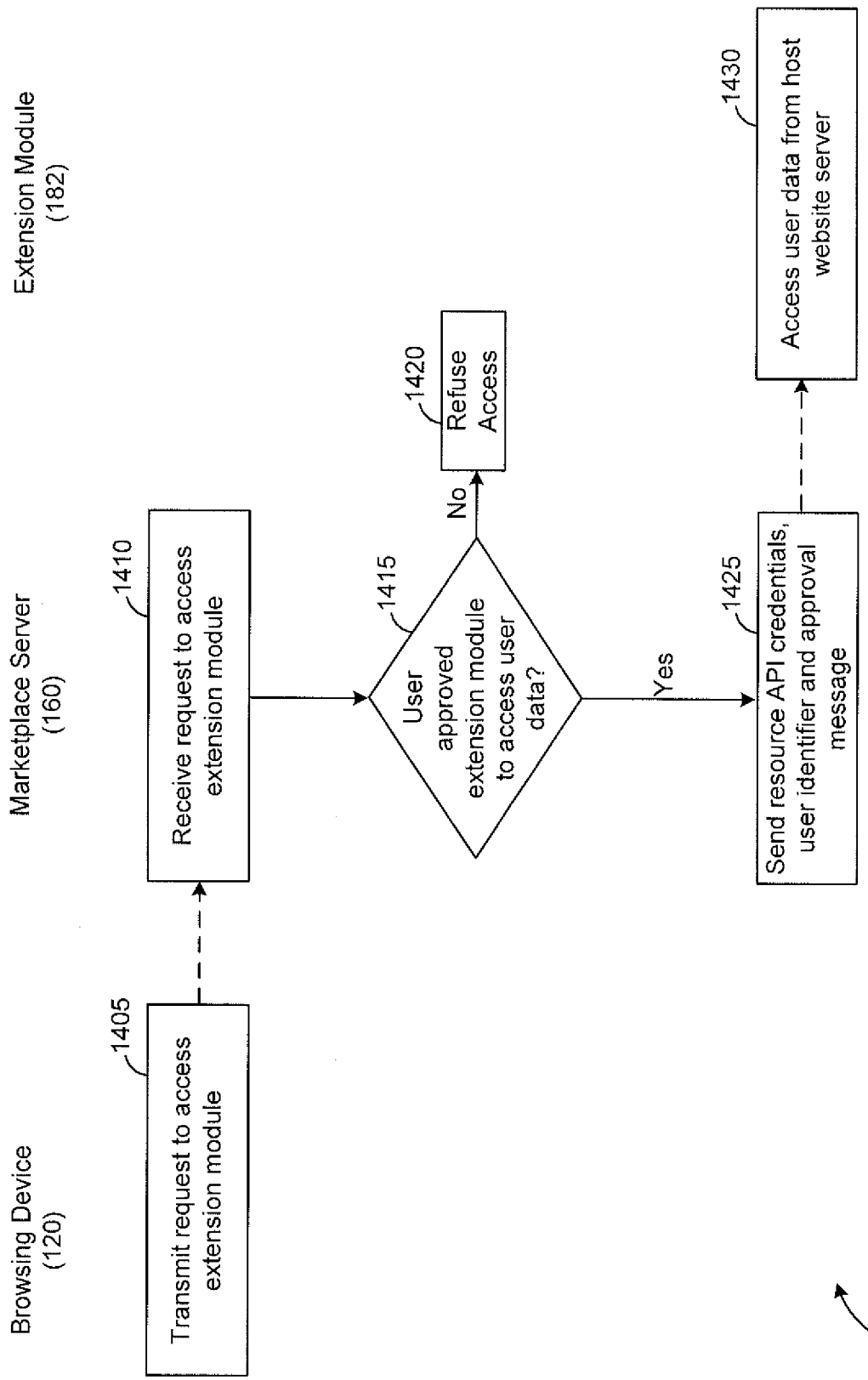

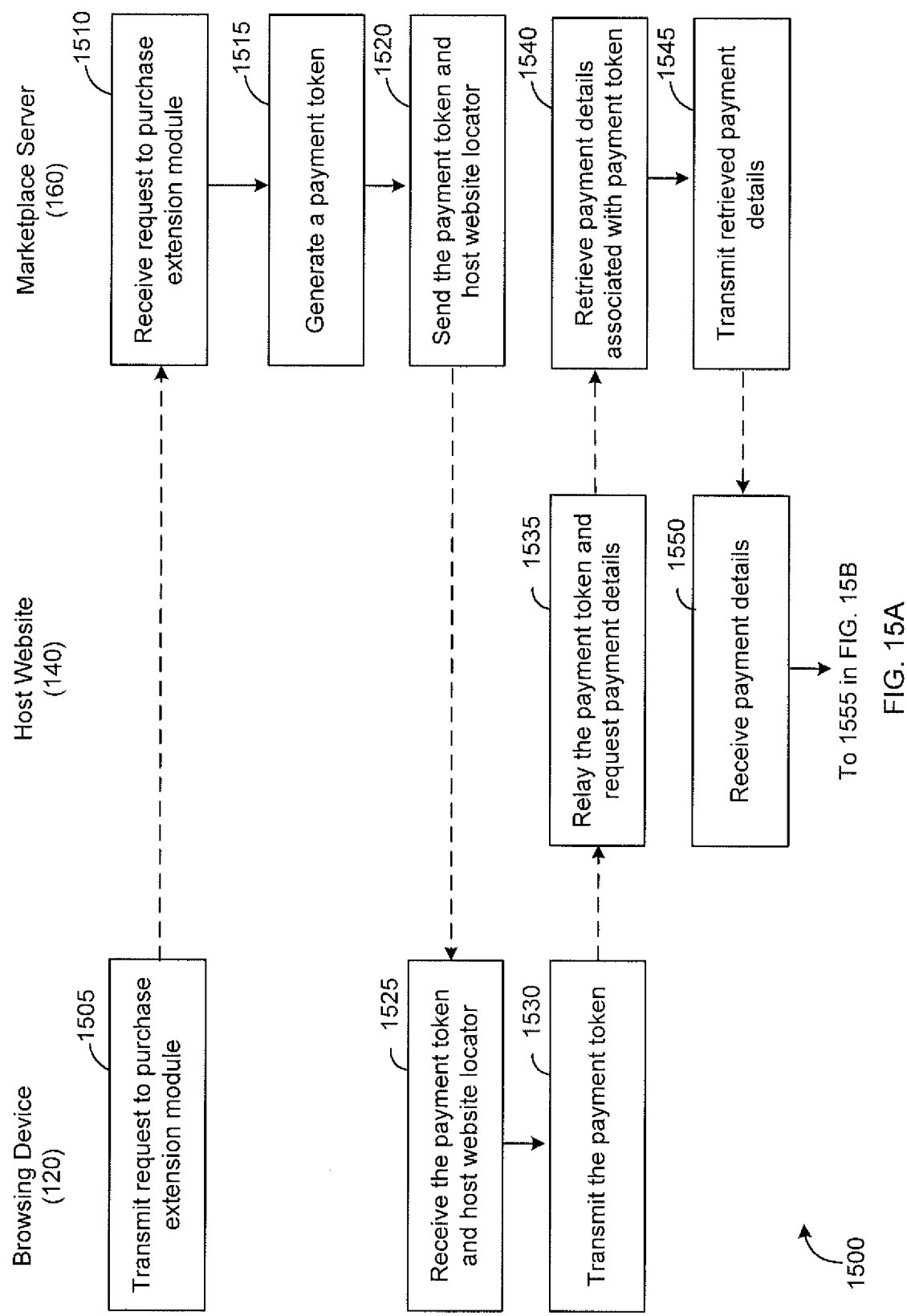

SYSTEM AND METHOD OF EXTENDING A HOST WEBSITE

CROSS-REFERENCE TO RELATED APPLICATIONS

This application claims the benefit of U.S. Provisional Application No. 61/774,908, filed on Mar. 8, 2013, the entire contents of which is incorporated herein by reference.

FIELD

The described embodiments are generally directed to websites, and in particular, systems and methods of extending a host website.

INTRODUCTION

Host websites provide information and functionality to computing devices having a web browser application. The information and functionality is typically provided in the form of a series of web pages hosted on a web server that is accessible via a network.

Conventionally, the content and functionality of a host website are created by the organization providing the host website. If it is desired for the host website to have additional content and/or functionality, the organization hosting the website would typically be required to undertake a time-consuming and expensive task of creating the additional content and/or functionality itself.

For example, if the host website were a financial news website that provided stock price information, and it was desired for the host website to have a new software tool to provides advanced stock price analysis, the organization would typically have to hire software developers to create the new software tool. This would create costs for the organization. As well, it would create delays for the host website because the software tool cannot be deployed until the software tool is created.

Some host websites address this shortcoming by providing a web platform that allows third-party software developers to provide functionality for their host website. Such web platforms, however, may themselves be difficult, time-consuming, and expensive to implement.

There is thus a need for improved systems and methods of extending a host website.

SUMMARY

In a first aspect, some embodiments of the present disclosure provide a method of providing access control. The method may include: receiving a request to access an extension module from a browsing device, the browsing device is for maintaining a browsing session with a host website, and the extension module is for extending the host website by exchanging data with the host website; generating a first authorization token that is associated with the browsing session; sending, to the browsing device, the first authorization token; receiving, at the extension module, a second authorization token from the browsing device; verifying that the second authorization token matches the first authorization token; and if verification is successful, allowing the extension module to exchange data with the host website and communicate with the browsing device.

In various embodiments, the method may include sending the first authorization token to the extension module so that the verifying can be performed by the extension module. In various embodiments, the method may include receiving the second authorization token from the extension module and then performing the verifying.

When sending the first authorization token to the browsing device, in various embodiments, the method may further include: sending, to the browsing device, a resource locator for the extension module.

In various embodiments, the request to access the extension module is received from the browsing device via the host website, and the host website acts as a proxy for the browsing device. In a similar vein, the first authorization token can be sent to the browsing device via the host website.

In various embodiments, the data exchanged between the extension module and the host website includes data associated with the browsing session. In various embodiments, the browsing session may be an authenticated session, and a user identifier may be used by the host website to authenticate the browsing device. In various embodiments, this user identifier may be sent to the extension module, and the extension module may use the user identifier to gain access to the data. In various embodiments, the data may actually be associated with the user identifier.

In various embodiments, the host website provides personal finance information, and the data to be exchanged includes: a portfolio, a watchlist, a list of debit transactions, a list of credit transactions, loan information, asset information and a list of historical transactions.

In various embodiments, the host website provides social media information, and the data to be exchanged includes: a name of a user, an email address of a user, a list of social media contacts, and one or more messages sent using the social media website.

In various embodiments, the host website provides news and opinion information, and the data to be exchanged includes: an article, a headline, a blog entry, and a review.

In various embodiments, the host website provides food information, and the data to be exchanged includes: an article, a food recipe, and a review.

In various embodiments, the host website provides fitness information, and the data to be exchanged includes: an article, a workout, a blog entry, and a review.

In various embodiments, the host website provides travel information, and the data to be exchanged includes: an article, a geographic location, a blog entry, and a review.

In various embodiments, the host website provides movie and television information, and the data to be exchanged includes: an article, information about a movie, information about a television show, information about an actor, and a review.

In various embodiments, the method may further include: receiving, from the extension module, a request to access data from the host website; determining if the extension module is authorized to access the requested data; if the extension module is authorized to access the requested data, generating a first data token associated with the browsing session; and sending the first data token and a host website locator to the extension module, so that the extension module can transmit the first data token to the host website when accessing the data. Moreover, in various embodiments, the method may then include: receiving a second data token from the host website; verifying that the second data token matches the first data token; and if verification is successful, sending a data descriptor for the data to the host website, and upon receiving the data descriptor, the host website transmits the data to the extension module.

In various embodiments, the method may include: receiving, from the extension module, a communication destined for the host website; and relaying the communication to the host website. In some cases, the communication may be a request to access data from the host website, and the method may further include: determining if the extension module is authorized to access the requested data; and if the extension module is authorized to access the data, relaying the request to the host website. The method may then further include: receiving the requested data from the host website; and transmitting the requested data to the extension module.

In some cases, the communication from the host website may include connection data that allows the host website to establish a direct connection with the extension module.

In various embodiments, the method may include: receiving, from the host website, a communication destined for the extension module; and relaying the request to the extension module. In some cases, the communication may be a query for data from the extension module. In some cases, the communication may be a query for data from all extension modules associated with the host website. In some cases, the communication may include connection data that allows the extension module to establish a direct connection with the host website.

In a second aspect, some embodiments of the present disclosure provide a computer readable medium storing instructions which, when executed by a processor, causes the processor to perform the methods described herein.

In a third aspect, some embodiments of the present disclosure provide a system for providing access control. The system may include an extension module for extending a host website; and a marketplace server comprising a processor and a memory storing instructions which, when executed by the processor, causes the processor to: receive a request to access the extension module from a browsing device, the browsing device is for maintaining a browsing session with the host website, and the extension module is for exchanging data with the host website; generate a first authorization token that is associated with the browsing session; and send, to the browsing device, the first authorization token. The extension module may then be configured to receive a second authorization token from the browsing device. One of the extension module or the marketplace server may be further configured to: verify that the second authorization token matches the first authorization token; and if verification is successful, allow the extension module to exchange data with the host website and communicate with the browsing device.

In various embodiments, the marketplace server may be configured to send the first authorization token to the extension module so that the verifying can be performed by the extension module. In various embodiments, the marketplace server may be configured to receive the second authorization token from the extension module so that it can perform the verifying itself.

When sending the first authorization token to the browsing device, in various embodiments, the marketplace server may be configured to: send, to the browsing device, a resource locator for the extension module.

In various embodiments, the request to access the extension module is received from the browsing device via the host website, and the host website may act as a proxy for the browsing device. In a similar vein, the first authorization token can be sent to the browsing device via the host website.

In various embodiments, the data exchanged between the extension module and the host website includes data associated with the browsing session. In various embodiments, the browsing session may be an authenticated session, and a user identifier may be used by the host website to authenticate the browsing device. In various embodiments, this user identifier may be sent to the extension module, and the extension module may use the user identifier to gain access to the data. In various embodiments, the data may actually be associated with the user identifier.

In various embodiments, the host website provides personal finance information, and the data to be exchanged includes: a portfolio, a watchlist, a list of debit transactions, a list of credit transactions, loan information, asset information and a list of historical transactions.

In various embodiments, the host website provides social media information, and the data to be exchanged includes: a name of a user, an email address of a user, a list of social media contacts, and one or more messages sent using the social media website.

In various embodiments, the host website provides news and opinion information, and the data to be exchanged includes: an article, a headline, a blog entry, and a review.

In various embodiments, the host website provides food information, and the data to be exchanged includes: an article, a food recipe, and a review.

In various embodiments, the host website provides fitness information, and the data to be exchanged includes: an article, a workout, a blog entry, and a review.

In various embodiments, the host website provides travel information, and the data to be exchanged includes: an article, a geographic location, a blog entry, and a review.

In various embodiments, the host website provides movie and television information, and the data to be exchanged includes: an article, information about a movie, information about a television show, information about an actor, and a review.

In various embodiments, the marketplace server may be configured to: receive, from the extension module, a request to access data from the host website; determine if the extension module is authorized to access the requested data; if the extension module is authorized to access the requested data, generate a first data token associated with the browsing session; and send the first data token and a host website locator to the extension module, so that the extension module can transmit the first data token to the host website when accessing the data. Moreover, in various embodiments, the marketplace server may be configured to: receive second data token from the host website; verify that the second data token matches the first data token; and if verification is successful, send a data descriptor for the data to the host website, so that upon receiving the data descriptor, the host website transmits the data to the extension module.

In various embodiments, the marketplace server may be configured to: receive, from the extension module, a communication destined for the host website; and relay the communication to the host website. In some cases, the communication may be a request to access data from the host website, and the marketplace server may be further configured to: determine if the extension module is authorized to access the requested data; and if the extension module is authorized to access the data, relay the request to the host website. The marketplace server may then be configured to: receive the requested data from the host website; and transmit the requested data to the extension module.

In some cases, the communication from the host website may include connection data that allows the host website to establish a direct connection with the extension module.

In various embodiments, the marketplace server may be configured to: receive, from the host website, a communication destined for the extension module; and relay the request to the extension module. In some cases, the communication may be a query for data from the extension module. In some cases, the communication may be a query for data from all extension modules associated with the host website. In some cases, the communication may include connection data that allows the extension module to establish a direct connection with the host website.

DRAWINGS

For a better understanding of embodiments of the systems and methods described herein, and to show more clearly how they may be carried into effect, reference will be made, by way of example, to the accompanying drawings in which:

FIGS. 4A and 4B are flowchart diagrams for a method of processing a request from an extension module for data stored on a host website, in accordance with an example embodiment;

FIG. 14 is a flowchart diagram for a method of accessing user's data from a host device in accordance with an example embodiment; and FIGS. 15A and 15B are flowchart diagrams for a method of processing payment by a host device in accordance with an example embodiment.

DESCRIPTION OF VARIOUS EMBODIMENTS

Figure 1:
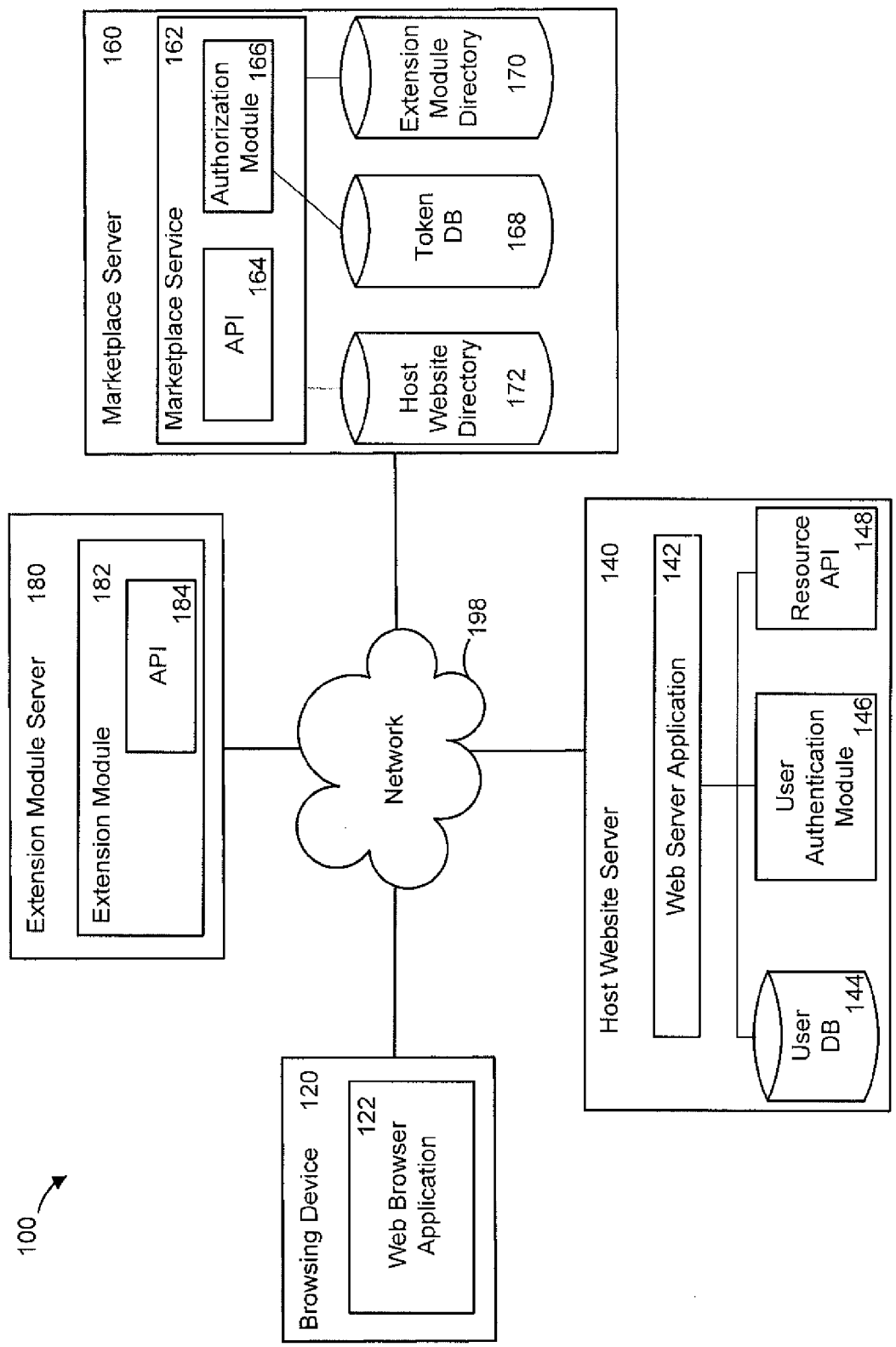
FIG. 1 is a block diagram of components of a system for extending a host website, in accordance with an example embodiment.

It will be appreciated that numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way, but rather as merely describing implementation of the various embodiments described herein.

The embodiments of the systems and methods described herein may be implemented in hardware or software, or a combination of both. However, these embodiments may be implemented in computer programs executing on programmable computers, each computer including at least one processor, a data storage system (including volatile and non-volatile memory and/or storage elements), and at least one communication interface. For example, the programmable computers may be a server, network appliance, set-top box, embedded device, computer expansion module, personal computer, laptop, personal data assistant, or mobile device. Program code is applied to input data to perform the functions described herein and to generate output information. The output information is applied to one or more output devices, in known fashion. In some embodiments, the communication interface may be a network communication interface. In embodiments in which elements of the invention are combined, the communication interface may be a software communication interface, such as those for inter-process communication (IPC). In still other embodiments, there may be a combination of communication interfaces.

Each program may be implemented in a high level procedural or object oriented programming or scripting language, or both, to communicate with a computer system. However, alternatively the programs may be implemented in assembly or machine language, if desired. In any case, the language may be a compiled or interpreted language. Each such computer program may be stored on a storage media or a device (e.g. ROM or magnetic diskette), readable by a general or special purpose programmable computer, for configuring and operating the computer when the storage media or device is read by the computer to perform the procedures described herein. Embodiments of the system may also be considered to be implemented as a non-transitory computer-readable storage medium, configured with a computer program, where the storage medium so configured causes a computer to operate in a specific and predefined manner to perform the functions described herein.

Furthermore, the system, processes and methods of the described embodiments are capable of being distributed in a computer program product including a physical non-transitory computer readable medium that bears computer usable instructions for one or more processors. The medium may be provided in various forms, including one or more diskettes, compact disks, tapes, chips, magnetic and electronic storage media, and the like. The computer useable instructions may also be in various forms, including compiled and non-compiled code.

From a high-level perspective, the present embodiments generally provide a standardized method of extending the functionality or content of a host website. By providing a centralized service that is able to catalogue the availability of, and control access to, extension modules for a number of different host websites, the host websites may be able to benefit from the additional functionality/content offered by the extension modules without implementing their own marketplace system.

Referring to FIG. 1, shown there generally as 100 is a block diagram of components of a system for extending a host website, in accordance with an example embodiment. The system may include a browsing device 120, a host website server 140, a marketplace server 160, and an extension module server 180.

The browsing device 120 may be any computing device capable of executing a web browser application 122. As will be understood, a web browser application 122 may be a software application for viewing and interacting with information on the "World Wide Web". The web browser application 122 may be configured to communicate via web protocols such as Hypertext Transfer Protocol (HTTP). As well, the web browsing application 122 may be configured to interpret information encoded using web technologies such as Hypertext Transfer Markup Language (HTML), Cascading Style Sheets (CSS). JavaScript, Extensible Markup Language (XML).

Traditionally, web browser applications 122 have been configured to conform to the "same origin policy." The same origin policy is a security policy that limits how a document or script loaded from one source (e.g., a marketplace server 160) can interact with resources from another source (e.g., a host website server 140). For example, when a web browser application 122 that conforms to the same origin policy is executing a script from the host website server 140, the web browser application 122 may disallow a request from the marketplace server 160 to access resources associated with the host website server 140.

Manufacturers of web browser applications 122 have recognized that strict adherence to the same origin policy may be too restrictive. As such, more recent web browser applications 122 may adopt a web standard (e.g., as published by the World Wide Web Consortium (W3C)) that allows for Cross-Origin Resource Sharing (CORS). CORS allows a given host website to specify a number of other sources that are allowed to access the resources of the given host website. A CORS-enabled web browser application 122 may then be configured to interpret this information, and allow scripts or documents loaded from the specified sources to access the resources associated with the CORS-enabled host website.

As will be understood, CORS may be considered one of many technologies that allow a web browser application 122 to perform cross-origin communications (e.g., communications that do not conform to the "same origin policy"). It will be understood that the embodiments referring to "CORS" discussed herein may generally be implemented using any one or combination of these technologies. For example, some of these additional technologies include: JavaScript Object Notation with Padding (JSONP), Web Sockets, and/or iFrames.

As will be discussed in greater detail below, whether or not the web browser application 122 is configured to be CORS-enabled may impact how the browsing device 120 communicates with the marketplace server 160 and/or the extension module server 180. It will be understood that both types of web browser applications 122 (e.g., CORS-enabled and non CORS-enabled) are contemplated by the present disclosure.

As will be understood, the browsing device 120 may include a processor, a memory for storing instructions executable by the processor, a display, an input device (e.g., a touchscreen or a physical keyboard), and a network interface for communicating with external computing devices. Examples of a browsing device may include a desktop computer, laptop computer, laptop computer, tablet computer, personal digital assistant (PDA), smartphone, and/or cellular phone.

Aspects of the host server 140 will now be discussed.

The host website server 140 may be any computing device that hosts a website for consumption by the browsing device 120. The host website server 140 may execute a web server application 142 such as Apache™ or Microsoft Internet Information Services™ (IIS). The web server application 142 may be configured to provide webpage information or functionality using the web technologies described above.

The host website server 140 may also include a user information database 144 that stores information about registered users of the host website 140. This information may include user authentication information (e.g., username/password pairs) that allows a user to "log in" for an authenticated browsing session with the host website server 140. The user information database 144 may also include data associated with a given user account stored on the host website server 140. For example, if the host website server 140 is a financial news website that provides financial information, the user information database 144 may store a portfolio of stocks for each user account.

The host website server 140 may implement a resource Application Programming Interface (API) 148 that provides an interface for external software modules (e.g., as may be executing on the marketplace server 160 and/or the extension module server 180) to access resources available on the host website server 140. The particular interactions amongst the marketplace server 160, the extension module server 180, and the resource API 148 when an extension module 182 requests access to a resource stored on the host website server 140 will be discussed below with respect to FIGS. 4A-4B.

While the "host website" may generally refer to the actual content of the website, and the "host website server" may generally refer to the physical computer executing the software to provide the website, the two terms will be used interchangeably herein.

Aspects of the marketplace server 160 will now be discussed.

The marketplace server 160 may be any computing device capable of executing a marketplace service 162 software module. Generally, the marketplace service 162 acts as a gateway for controlling access between the host website server 140 and a given extension module 182. For example, the marketplace service 142 may further be configured to coordinate the initialization process that authorizes an extension module 182 to be accessed by a browsing device 120 (as is described with respect to FIGS. 2 and 3 below). As well, the marketplace service 142 may be configured to validate a request from an extension module 182 to access data stored on a host website server 140 (as is described with respect to FIGS. 4A-4B below). It will be understood that the steps indicated below as being performed by the marketplace server 160 may generally be performed by the marketplace service 162 executing on the marketplace server 160.

The marketplace service 162 may include a marketplace API 164 that is externally accessible by the browsing device 120, the host website server 140, and/or the extension server 182. The marketplace API may be accessed when these various devices communicate with the marketplace server 160 (as discussed below).

The marketplace service 162 may also contain an authentication module 166 that is configured to perform various tasks associated with user authentication. When performing authentication, the user authentication module 166 may be configured to generate a number of different security tokens (e.g., the authorization token and/or the data token discussed below) are transmitted to other computing devices to allow them to subsequently prove authentication. These tokens may be stored in the token database 168, so that they are available for making a determination of whether any subsequently received token is valid.

The marketplace service 162 may provide a centralized catalogue of available extension modules that can be used with the host website 140. In various embodiments, the marketplace service 162 may be electronic commerce store that allows users to purchase access to a given extension module 182, for example. To allow a browsing device 120 to determine the extension modules 182 that are available for a given host website 140, the marketplace service 142 may be configured to provide a marketplace user interface (UI) that displays the available extension modules 182 for a given host website 140. The catalogue of available extension modules 182 may be stored in the extension module directory 170. In various embodiments, the extension module directory 170 may not store the actual software modules that provide the content/functionality of an extension module. Rather, the directory 170 may simply store a locator (e.g., a Uniform Resource Locator (URL)) of where the extension module 182 can be accessed.

Each entry within the extension module directory 170 may contain a field that contains a class or category of an extension module. Such classification or categorization may allow a user of the browsing device 120 to search for extension modules 182 by category or classification. The classification or category may be used by the marketplace service 162 to restrict the extension modules 182 that are shown to a given browsing device. For example, an extension module 182 with a 'Food' category may be restricted from being shown if the host website 140 is a personal finance website.

Similar to the extension module directory 170, the marketplace server 160 may further contain a host website directory 172 that allows the marketplace server 160 to keep track of the host websites 140 that have installed the marketplace service 162 on their website.

Aspects of the extension module server 180 will now be described.

The extension module server 180 may contain an extension module 182 that provides additional content or functionality for a host website 140. In various embodiments, the extension module 182 may be considered an "application" or an "app" that extends the content/functionality of host website 140. The extension module 182 may contain an API 184 that allows external services to initiate communication with the extension module 182. For example, as discussed below with respect to FIGS. 2A, 2B, 3A, and 3B, a browsing device 120 may initiate communications with an extension module 182 to access the content/functionality provided by the extension module 182.

Some non-limiting illustrative examples of the content/functionality provided by an extension module may include: a set of analytical tools for analyzing pre-existing financial data stored on a personal finance website; additional recipes for food review website; and a new multi-player game that allows members of a social network to play with each other.

It will be understood that each of the host website server 140, the marketplace server 160 and the extension module server 180 may include one or more processors, and one or more memories for storing instructions executable by the one or more processors. The various servers may also each include a network interface for connecting to network 198 in order to communicate with other components of the system 100.

It will also be understood that the marketplace server 160 and/or the extension module 182 may communicate with the browsing device 120 using the same web technologies used by host website server 140 (as discussed above)

Network 198 may be any network(s) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others, including any combination of these.

It will be understood that although only a single host website server 140, a single marketplace server 160 and a single extension module server 180 are shown in FIG. 1 for clarity, there may be multiple physical servers of each type distributed over a wide geographic area and connected via network 198, for example. Similarly, although only one browsing device 120 has been illustrated, any suitable number of browsing devices 120 may connect each of the various illustrated servers.

In particular, it will be understood that the marketplace server 160 may serve as a standardized interface for extension modules 182 to a number of different host websites 140. For example, a single marketplace server 160 may provide a uniform access to extension modules 182 for one or more personal finance website, one or more social media website, and/or one or more food review website simultaneously.

Various details about the interaction amongst the browsing device 120, the host website server 140, the marketplace server 160 and the extension module server 180 will now be discussed.

Marketplace Server Providing a Browsing Device Access to an Extension Module

Figure 2A:
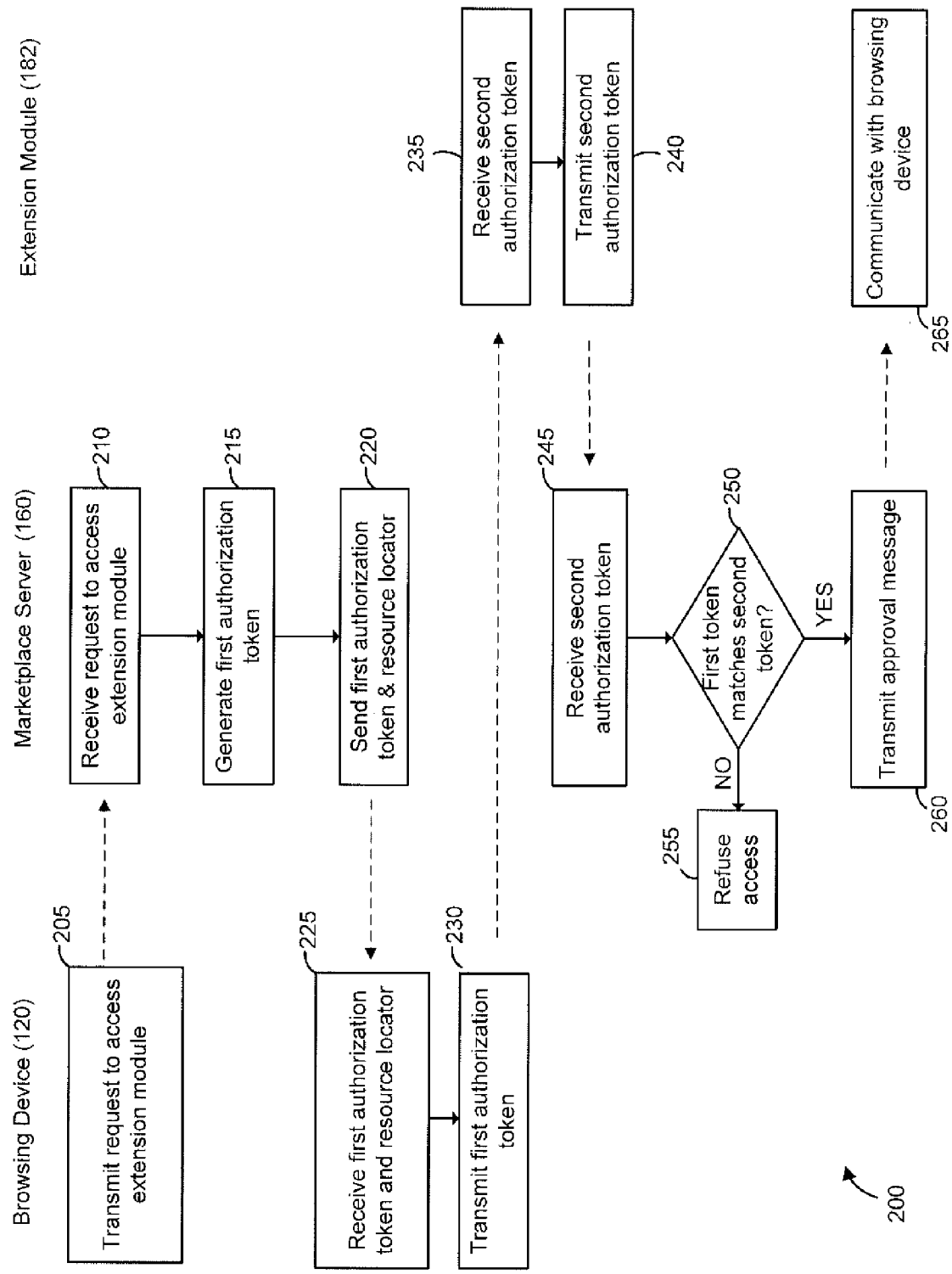
FIGS. 2A and 2B are flowchart diagrams for methods of providing access to an extension module in accordance with another example embodiment.

Referring to FIG. 2A, shown there generally as 200 is a flowchart diagram of providing access to an extension module, in accordance with an example embodiment. Reference will simultaneously be made to the components discussed above with respect to FIG. 1.

Figure 7:
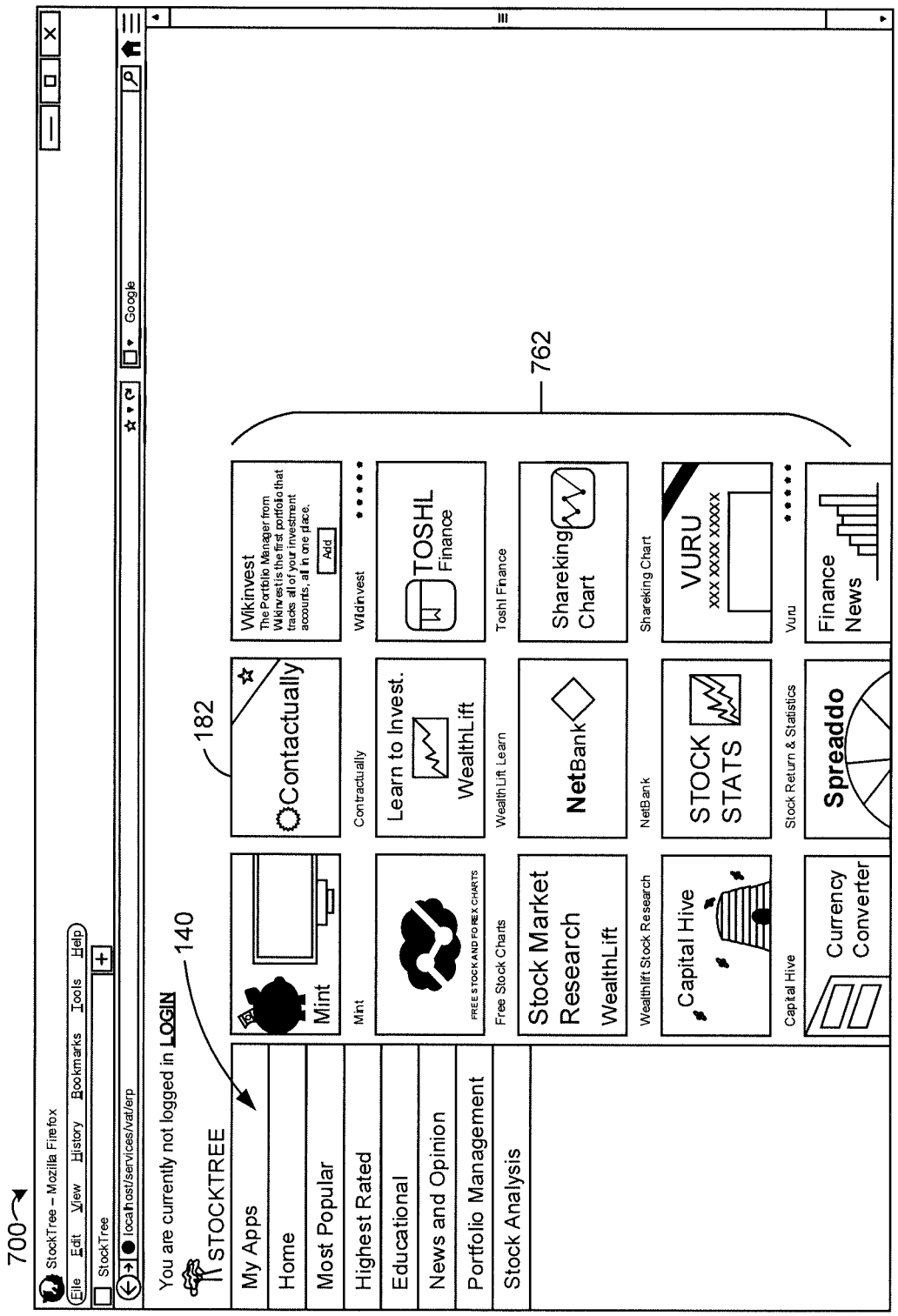
FIG. 7 is a screenshot of a user interface in accordance with an example embodiment.

As noted above, the marketplace server 160 may make available to the browsing device 120 a number of different available extension modules 182 that can be used with a given host website 140. Generally, the browsing device 120 may display the extension modules 182 that are available, and then receive input selecting an extension module 182 that is desired to be used. Referring briefly to FIG. 7, shown there is an example screenshot of a marketplace UI 762 that may allow the selection of an extension module 182 to be used.

At step 205, the browsing device 120 may transmit a request to access a selected extension module 182 to the marketplace server 160. This request may be received at step 210. The browsing device 120 may be maintaining a browsing session with the host website 140 when steps 205 and 210 are performed. As discussed below with respect to FIGS. 4A and 4B, the extension module 182 may exchange data with the host website 140.

At step 215, the marketplace server 160 may generate a first authorization token that is associated with the browsing session between the browsing device 120 and the host website 140. At step 220, the marketplace server 160 may send, to the browsing device 120, the first authorization token and a resource locator for the extension module. The first authorization token may be a randomly generated cryptographic value that is difficult for another party to reproduce. The first authorization token may subsequently be used by the browsing device 120 to prove that it has obtained authorization from the marketplace server 160 to access the extension module 182 it is requesting to access.

At step 225, the browsing device 120 receives the first authorization token and the resource locator. The resource locator may be a URL or an Internet Protocol (IP) address for the extension module 182, for example. At step 230, the browsing device 120 may transmit the first authorization token 230 to the extension module 182 located by the resource locator.

At step 235, the extension module 182 may receive an authorization token. In the typical scenario where the browsing device 120 attempts to access the extension module 182 in a legitimate fashion, the authorization token may be the first authorization token transmitted by the browsing device 120 at step 230. In other scenarios, the extension module 182 may receive the authorization token from another device that has not obtained legitimate authorization from the marketplace server 160, such that the authorization token may be illegitimate (e.g., the authorization token may be forged or expired). In the context of FIG. 2A (as well as FIGS. 2B, 3A, and 3B, discussed below), the term "second authorization token" generally refers to the authorization token received by the extension module 182 at step 235. From the perspective of the extension module 182, the second authorization token is purported to be legitimate. However, step 250 may need to be performed to verify whether the second authorization token is, in fact, legitimate.

To validate the second authorization token, the extension module 182 may transmit the second authorization token to the marketplace server 160 at step 240.

At step 245, the marketplace server 160 may receive the second authorization token from the extension module 160. At step 250, the marketplace server 160 may then proceed to verify whether the second authorization token received from the extension module 182 at step 245 matches the first authorization token generated at step 215. If the second authorization token does not match the first authorization token (the 'NO' branch where verification is unsuccessful), then the marketplace server 160 may indicate to the extension module 182 that the second authorization token received by the extension module at step 235 is not valid (e.g., that the device that transmitted the second authorization token to the extension module 182 should be refused access (step 255)).

If the second authorization token matches the first authorization token (the 'YES' branch at step 245 where verification is successful), the marketplace server 160 may then transmit an approval message to the extension module 182 to indicate that the browsing device 120 seeking to access the extension module 182 has been properly authorized by the marketplace server 160 (step 260). In various embodiments, in addition to the approval message, the marketplace server 160 may also send a user identifier to the extension module 182. The user identifier may subsequently be used by the extension module 182 to identify the user that is requesting access to the extension module 182. For example, the user identifier may be associated with an authenticated browsing session between the browsing device 120 and the host website 140, and the extension module 182 may use the user identifier to retrieve data associated with the authenticated browsing session from the host website 140.

At step 265 the extension module 182 may then initiate communications with the browsing device 120 to provide the additional content/functionality sought by the browsing device 120. In various embodiments, the extension module 182 may further generate a session token and communicate the session token to the browsing device 120. The session token may then be used by either or both of the browsing device 120 and the extension module 182 to identify communications therebetween.

Figure 2B:
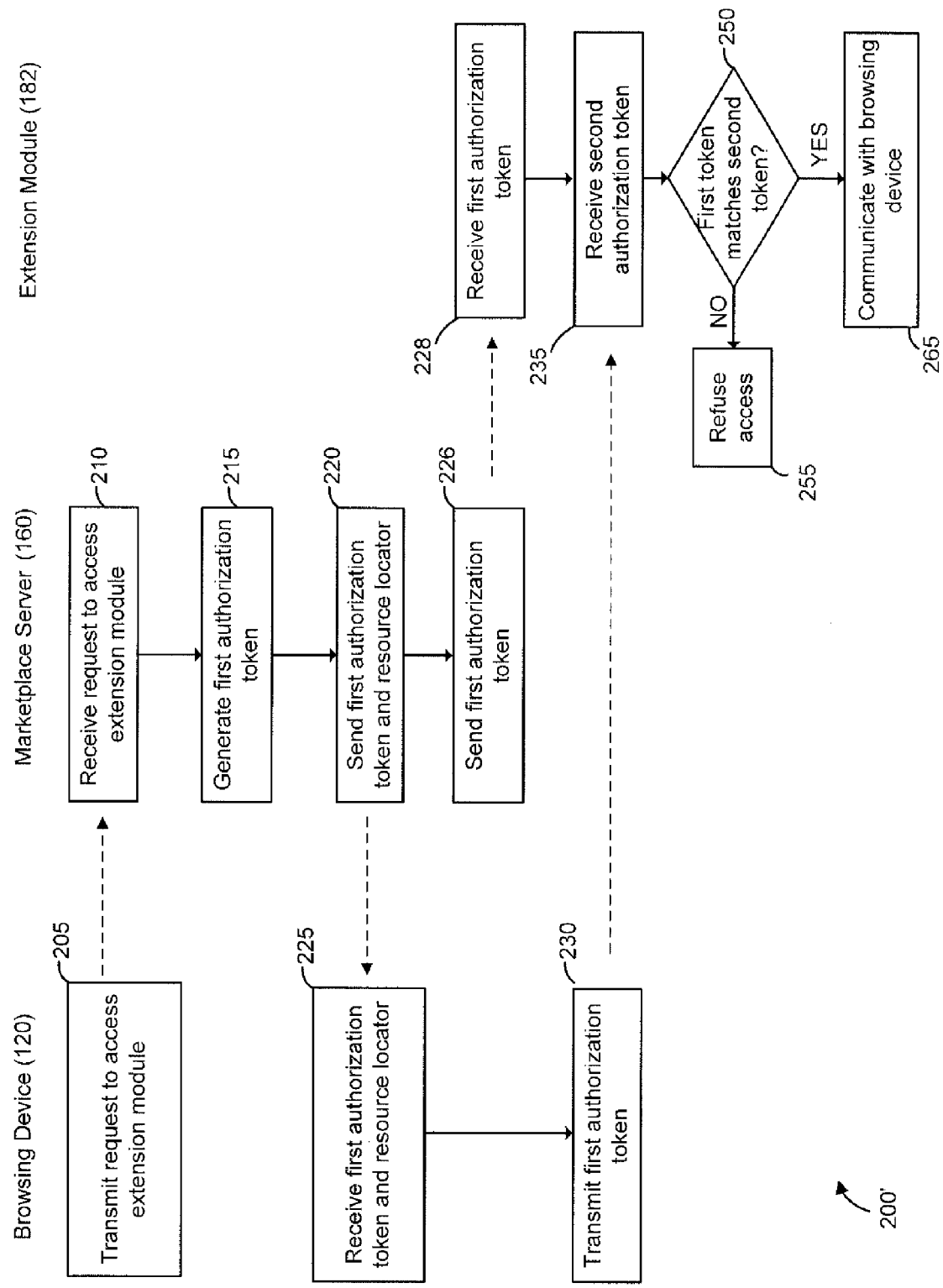

Referring to FIG. 2B, shown there generally as 200' is a flowchart diagram of a method of providing access to an extension module, in accordance with another example embodiment. The method illustrated in FIG. 2B is similar to the method illustrated in FIG. 2A, except that the step of verifying whether the second authorization token matches the first authorization token is performed at the extension module 182 instead of at the marketplace server 160. When discussing the method of FIG. 2B below, reference will simultaneously be made to the components of FIG. 1.

In FIG. 2B, steps 205-225 may be performed in a manner similar to the similarly-numbered steps shown in FIG. 2A. As discussed, these steps may result in the marketplace server 160 sending a first authorization token to the browsing device 120.

At step 226, the marketplace server 160 may also transmit the first authorization token directly to the extension module 182. The extension module 182 receives the first authorization token at step 228. As discussed below, having received the first authorization token, the extension module 182 may then compare a later-received second authorization token against the first authorization token.

At step 230, the browsing device 120 may transmit the first authorization token to the extension module 182. At step 235, the extension module 182 may receive an authorization token. Similar to the discussion with respect to FIG. 2A, this authorization token may or may not be legitimate, and the term "second authorization token" is used to refer to the authorization token received by the extension module 182 at step 235.

At step 250, the extension module 182 may proceed to determine if the first authorization token (e.g., as received at step 228) matches the second authorization token (e.g., as received at step 235). If they match, the extension module 182 may begin exchanging data with the host website 140 and/or communicating with the browsing device 120 (step 265). If they do not match, the browsing device 120 may be denied access to the extension module 182 (step 255). As will be understood, steps 250, 255, and 265 may be performed in a manner similar to the similarly-numbered steps shown in FIG. 2A.

By performing the verification of the second authorization token at the extension module 182, the method of FIG. 2B may allow the marketplace server 160 to operate more efficiently. This is because the processing burden associated with performing the verification can be offloaded to the extension module 182. However, by relinquishing control of the verification decision to the extension module 182, the marketplace server 160 may have less control with respect to whether or not a browsing device 120 is ultimately allowed access to the extension module 182.

Figure 3A:
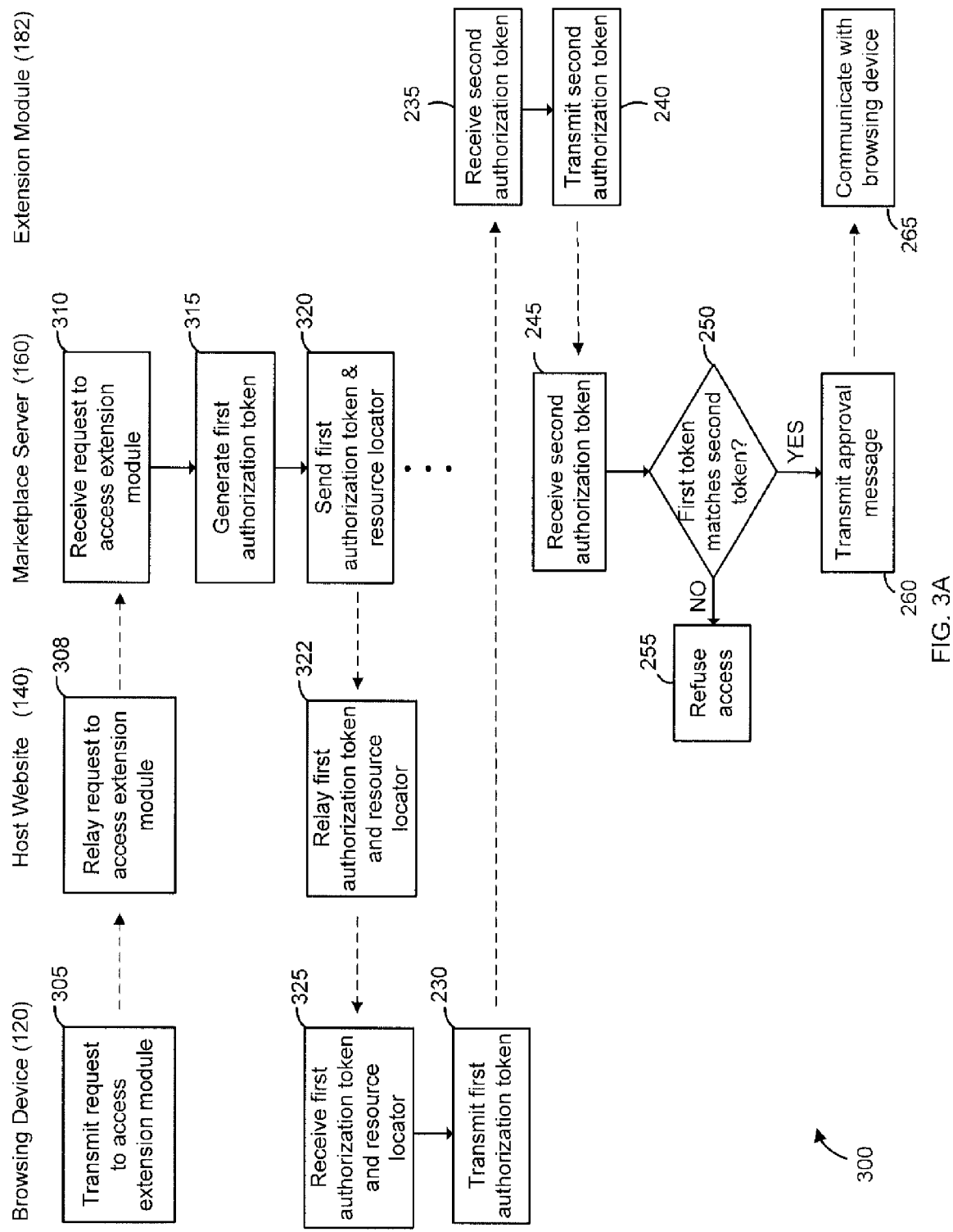
FIGS. 3A and 3B are flowchart diagrams for methods of providing access to an extension module in accordance with another example embodiment.

Referring to FIG. 3A, shown there generally as 300 is a flowchart diagram of a method of providing access to an extension module, in accordance with another example embodiment. When discussing FIG. 3A below, reference will also simultaneously be made to the components in FIG. 1.

The embodiment shown in FIG. 3A is generally similar to that which is shown in FIG. 2A, except that it is designed to operate with a web browser application 122 on the browsing device 120 that is not enabled to communicate using CORS technologies. As discussed above, a CORS-enabled browsing application 120 allows documents or scripts loaded from a source that is different from the host website to access resources that would otherwise be prohibited from being accessed under the 'same origin policy.' In the embodiment of FIG. 2A, the host website 140 may have already indicated to the CORS-enabled browser application 122 that marketplace server 160 is a source that can access data associated with the host website 140. This may allow the direct communication between the browsing device 120 and the marketplace server 160 in steps 205-225.

In the method of FIG. 3A (as well as FIG. 3B, discussed below), however, the web browser application 122 on the browsing device 120 may not be CORS-enabled, and as such, the browsing device may not be able to communicate directly with the marketplace server 160. As a result, the host website 140 may be configured to be a proxy that relays communications between the marketplace server 160 and the browsing device 120.

As illustrated, the steps performed in the method of FIG. 3A generally achieve a similar result as the method illustrated in FIG. 2A. For example, the steps of the method may similarly provide a method of allowing a browsing device 120 to access a particular given extension module 182 that is selected to be accessed by a user of the browsing device 120.

At step 305, the browsing device 120 transmits a request to access the extension module 182. In the method of FIG. 3A, however, since the browsing device 120 cannot communicate directly with the marketplace server 160, the browsing device 120 transmits the request to the host website 140 with which it is having a browsing session. The host website 140 then relays the request to the marketplace server 160 at step 308. At step 310, the marketplace server 160 may then receive the request to access the extension module 182.

In a manner similar to step 215 in FIG. 2A, the marketplace server may generate a first authorization token at step 315.

Similar to step 220 in FIG. 2A, at step 320, the marketplace server 160 may then transmit the first authorization token and a resource locator. However, since the browsing device 120 in FIG. 3A is not configured to communicate directly with marketplace server 160, the marketplace server may first transmit the first authorization token and the resource locator to the host website 140. The host website may then receive and relay the first authorization token and resource locator to the browsing device 120 (at step 322). At step 325, the first authorization token and the resource locator may then be received at the browsing device 120.

The remaining steps of steps 230-265 in FIG. 3A may be performed in similar manner to the steps with the same reference numerals in FIG. 2A discussed above.

Figure 3B:
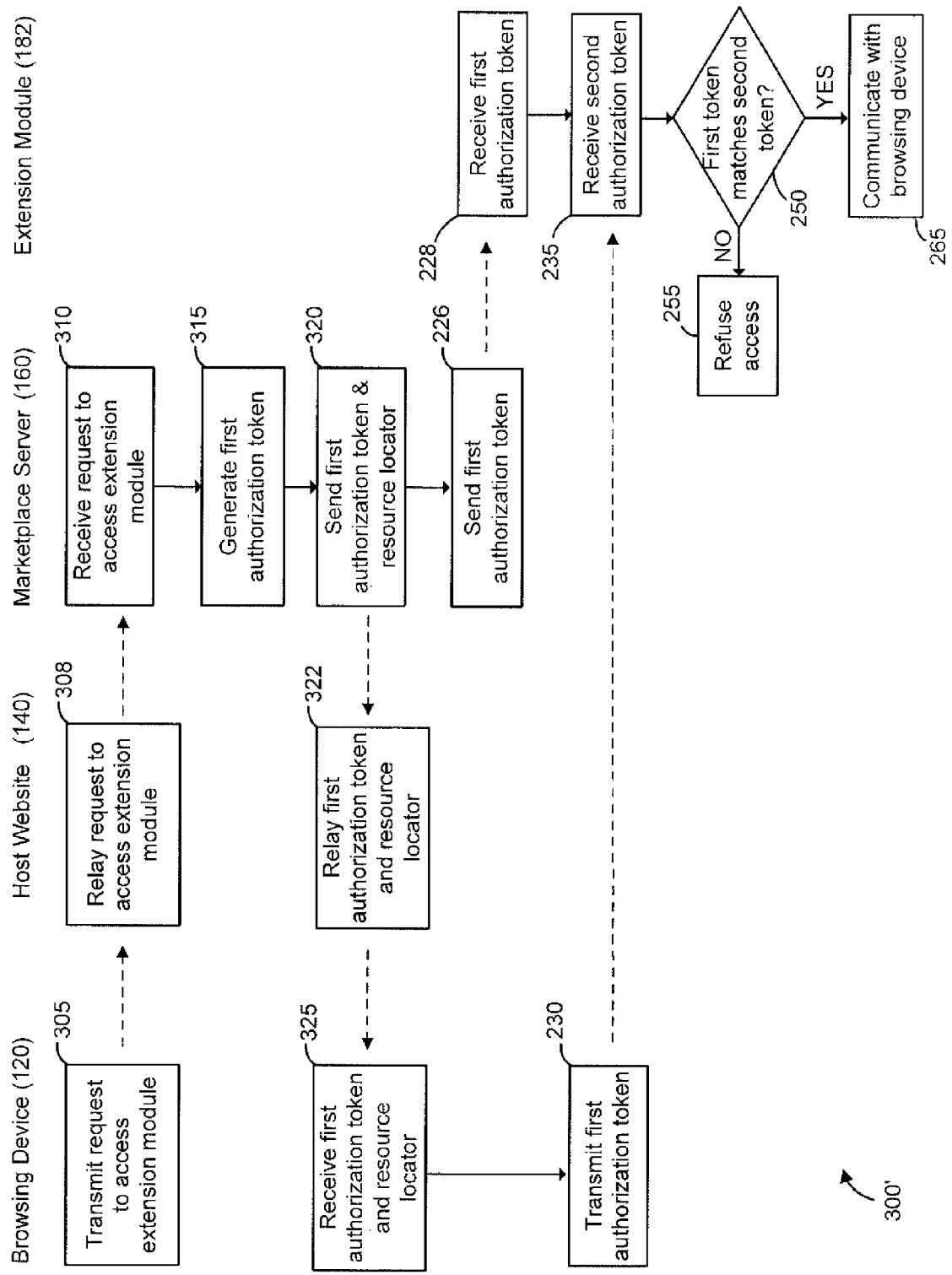

Referring to FIG. 3B, shown there generally as 300' is a flowchart diagram of a method of providing access to an extension module, in accordance with a further example embodiment. The method illustrated in FIG. 3B can be considered as having features of both the methods of FIGS. 3A and 2B. For example, the method of FIG. 3B is similar to the method of FIG. 3A in that the host website 140 may be configured to act as a proxy that relays communications between the marketplace server 160 and the browsing device 120. At the same time, the method of FIG. 3B is similar to the method of FIG. 2B in that the step of verifying whether the second authorization token matches the first authorization token is performed at the extension module 182 instead of at the marketplace server 160.

Particularly, steps 305-325 may be performed in a manner similar to the steps with the same reference numerals shown in FIG. 3A. As discussed, these steps may result in the marketplace server 160 sending a first authorization token to host website 140, which may relay the first authorization token to the browsing device 120.

Steps 226-265 may then be performed in a manner similar to the steps with the same reference numerals shown in FIG. 2B. As discussed, these steps may result in the marketplace server 160 sending the first authorization token to the extension module 182 so that the extension module 182 may itself directly verify whether a later-received "second authorization token" matches the first authorization token.

Figure 4A:
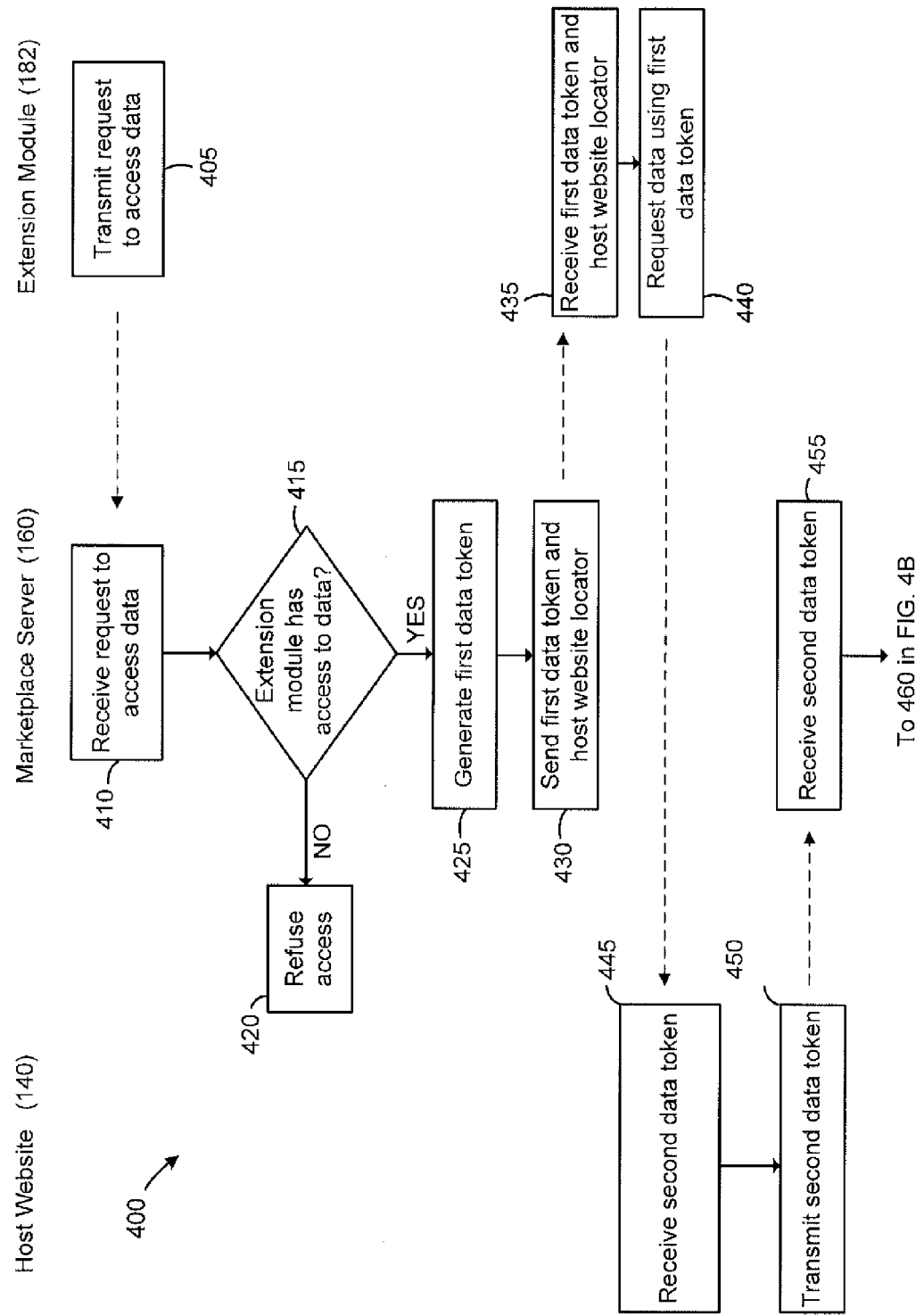

Marketplace Server Providing an Extension Module Access to Data of the Host Website Referring to FIGS. 4A-4B, shown there generally as 400, are flowchart diagrams for a method of processing a request from an extension module for data stored on a host website, in accordance with an example embodiment. Reference will simultaneously be made to the components of FIG. 1.

Once an extension module 182 has been authorized to be accessed by a browsing device 120 (e.g., by performing the steps of the method of FIG. 2 or 3 above), the extension module 182 may begin providing the additional functionality or content to the browsing device 120. In various embodiments, the extension module 182 may exchange data with host website 140. FIGS. 4A-4B show how the marketplace server 160 may be able to control whether an extension module 182 is to be granted access to the data stored on the host website 140.

At step 405, the extension module 182 may transmit, to the marketplace server 160, a request to access data stored on the host website 140. This request may be received at step 410. In various embodiments, the request may include a user identifier that identifies an authenticated browsing session between the host website 140 and the browsing device 120.

At step 415, the marketplace server 160 may determine whether the extension module 182 has access to the requested resource(s). For example, the marketplace may be configured to lookup the resources that a user has granted the extension module 182 access to. If the user has not granted access to the requested resource, the marketplace server may refuse the request at step 420 (the 'NO' branch at step 415).

It will be understood that when an extension module 182 is first registered to be available on the marketplace server 160, the extension module 182 may provide a list of resources of the host website 140 that it desires access to (e.g., in an application manifest) in order to operate. Subsequently, when a user of the browsing device 120 requests to use the extension module 182, the marketplace server 160 may send a request to the browsing device 120 to inquire whether the user of the browsing device 120 allows or denies the given extension module 182 access to the requested resources.

Figure 9:
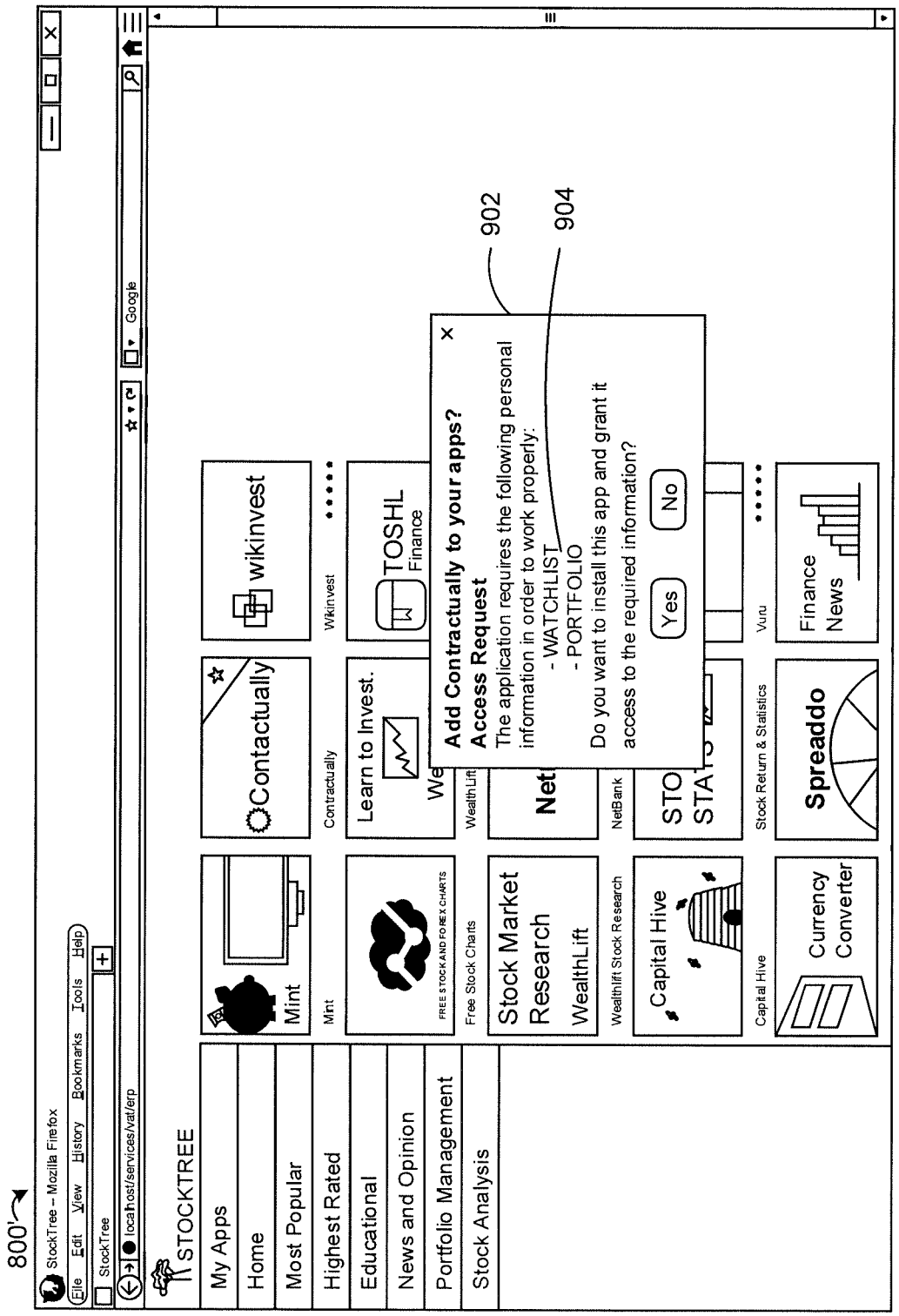
FIG. 9 is a screenshot of a user interface in accordance with another example embodiment.

For example, in the example where the extension module 182 provides advanced analytical tools for a personal finance host website 140, the extension module may have indicated that it would like access to the 'portfolio' or 'watchlist' data items stored on the personal finance host website 140. The marketplace server 160 may then have requested a user of the mobile device 120 to indicate whether they approve or deny access by the extension module 182 to these data items. Referring briefly to FIG. 9, shown there generally as 900 is an example screenshot of such an inquiry provided by the marketplace server 160 that asks a user whether they would like to grant an extension module access to 'Watchlist' and 'Portfolio' resources.

Referring back to FIG. 4A, if the marketplace server 160 determines that the extension module 182 does have access to the requested data, the marketplace may then proceed to step 425 (the 'YES' branch at step 415).

At step 425, the marketplace server 160 may generate a first data token, and at step 430, the marketplace server 160 may then send the first data token and a host website locator to the extension module 182. Similar to the authorization tokens discussed above with respect to FIGS. 2 and 3, the first data token may be a randomly generated cryptographic value that is difficult for another party to reproduce. The first data token may subsequently be used by the extension module 182 to prove that it has obtained authorization from the marketplace server 160 to access the requested data stored on the host website 140.

At step 435, the extension module 182 receives the first data token and the host website locator. The host website locator may be a URL or an Internet Protocol (IP) address for the host website 140, for example. At step 440, the extension module 182 may then transmit the first data token to the host website 140 located by the host resource locator.

At step 445, the host website 140 may receive a data token. In the typical scenario where the extension module 182 attempts to access the host website 140 in a legitimate fashion, the data token may be the first data token transmitted by the extension module 182 at step 440. In other scenarios, the host website 140 may receive the data token from another device that has not obtained legitimate authorization from the marketplace server 160, such that the data token may be illegitimate (e.g., the data token may be forged or expired). In the context of FIG. 4A, the term "second data token" generally refers to the data token received by the host website 140 at step 445. From the perspective of the host website 140, the second data token is purported to be legitimate. However, steps 450 to 460 (as shown in FIG. 4B) may need to be performed to verify whether the "second data token" is, in fact, legitimate.

To validate the second data token, the host website 140 may transmit the second data token to the marketplace server 160 at step 450.

At step 455, the marketplace server 160 may receive the second data token from the host website 140.

Referring now to FIG. 4B, the method 400 of FIG. 4A continues at step 460. At step 460, the marketplace server 160 may verify whether the second data token received from the host website 140 at step 455 in FIG. 4A matches the first data token generated at step 425 of FIG. 4A. If the second data token does not match the first data token (the 'NO' branch where verification is unsuccessful), then the marketplace server 160 may indicate to the host website 140 that the second data token received by the host website 140 at step 445 is not valid (e.g., that the device that transmitted the second data token to the host website 140 should be refused access (step 465)).

If the second data token matches the first data token (the 'YES' branch at step 460 where verification is successful), the marketplace server 160 may send a data descriptor to the host website 140 for the data that the extension module 182 is requesting. The data descriptor may be generated based on information received in the request at step 410 of FIG. 4A. The data descriptor may be received at the host website 140 at step 475.

At step 480, the host website 140 may then transmit the requested data that is identified by the data descriptor to the extension module 182. The requested data may then be received by the extension module 182 at step 490.

It will be understood that the extension module 182 may access different types of data stored on the host website 140 depending on the nature of host website 140 and/or the type of content/functionality provided by the extension module 182. For example, in the scenario where the host website 140 is a personal finance website and the extension module 182 provides advanced analytical tools for analyzing financial information, the data available to be exchanged between a host website 140 and an extension module 182 may include: a portfolio, a watchlist, and/or a list of historical transactions.

In another example, the host website 140 may provide social media information (e.g., a social media website), and the data available to be exchanged between a host website 140 and an extension module 182 may include: a name of a user, an email address of a user, a list of social media contacts, and/or one or more messages sent using the social media website.

In another example, the host website 140 may provide food information (e.g., a food/restaurant review website), and the data available to be exchanged between a host website 140 and an extension module 182 may include: recipes, comments on recipes, food reviews, and/or restaurant reviews.

In yet another example, the host website 140 may provide news and opinion information (e.g., the website of a news publication), and the data available to be exchanged between a host website 140 and an extension module 182 may include: an article, a headline, a blog entry, and/or a review.

In a further example, the host website 140 may provide fitness information (e.g., a website for an athletic store or a physical exercise community), and the data available to be exchanged between a host website 140 and an extension module 182 may include: an article, a workout, a blog entry, and/or a review.

Moreover, the host website may provide travel information (e.g., an airline website or a travel booking website), and the data available to be exchanged between a host website 140 and an extension module 182 may include: an article, a geographic location, a blog entry, and/or a travel destination review.

Also, the host website may provide movie and television information (e.g., a website that provides a database containing information about movies and/or television), and the data available to be exchanged between a host website 140 and an extension module 182 may include: an article, information about a movie, information about a television show, information about an actor, and/or a review.

It may be noted that even though different types of example websites are discussed herein, similar types of data may be exchanged between a host website 140 and an extension module 182. For example, both a travel website and a food website may provide blog entries. To facilitate the exchange of data between a host website 140 and an extension module 182, the host website 140 and/or the extension module 182 may additionally or alternatively be able to indicate the type of data that can be exchanged (e.g., available to be accessed or desired to be retrieved). For example, the table below provides a non-exhaustive list of general data types that may be exchanged, as well as example data items that may be categorized as being of a particular data type.

| Data Type | Example Data Item(s) |
| --- | --- |
| Messages | Email, Tweet, Chat Message, Instant Message, Blog Post |
| Reviews | Travel Destination Review, Food Recipe Review, Establishment (e.g., restaurant, clinic, hair stylist) Review, Fitness Routine Review, Games Review, Television Show Review, Movie Review, Retail Product Review, Retail Services Review |
| Instructions | Food Recipe, Fitness Routine, Education Resource |
| Scores | Game (sporting or otherwise), Election Result, Test |
| Location-based | Weather, Travel Destination |
| Transaction Data | Banking Transactions, Accounting Statement |
| Contacts | Friends, Associates |
| Articles | News, Blog Post |
| Media | Photo, Picture, Video, Movies, Clips, Songs, Ringtones, Playlists |

Figure 10:
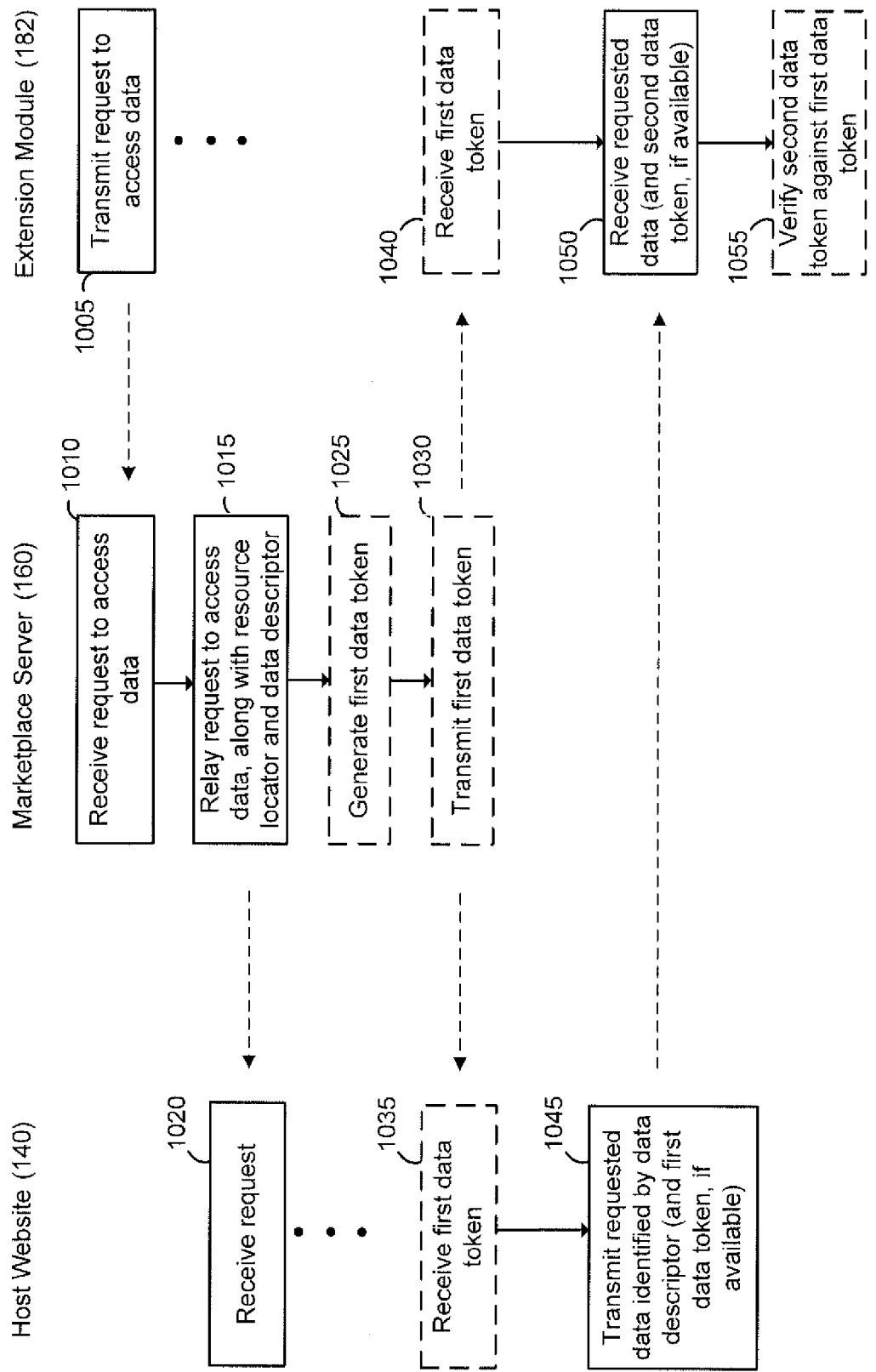
FIG. 10 is a flowchart diagram for a method of processing a request from an extension module for data stored on a host website, in accordance with another embodiment.

Referring to FIG. 10, shown there generally as 1000, is a flowchart diagram for a method of processing a request from an extension module for data stored on a host website, in accordance with another example embodiment. The method illustrated in FIG. 10 may serve a similar purpose as the method shown in FIGS. 4A-4B, in that the marketplace server 160 may provide an extension module 182 access to data of the host website 140. However, in the method illustrated in FIG. 10, instead of the marketplace server 160 returning a token to the extension module 182 so that the extension module 182 can directly request the data from the host website 140, the marketplace server 160 may relay the request to the host website 140. In discussing FIG. 10 below, reference will simultaneously be made to the components of FIG. 1.

At step 1005, the extension module 182 transmits a request to access data to the marketplace server 160. This request is received at step 1010. While not illustrated in FIG. 10, the marketplace server 160 may perform steps to verify that the extension module 182 has access to the data that is requested. For example, these steps may be similar to steps 415 and 420 shown in FIG. 4A.

At step 1015, the marketplace server 160 may relay the request to access data to the host website 140. The request relayed to the host website 140 may also include a data descriptor for the data that the extension module 182 is requesting to access. Additionally, the relayed request may also include a resource locator that allows the host website 140 to locate the extension module 182 for communication. For example, the resource locator may be a URL or an IP address for the extension module 182.

The request relayed by the marketplace server 160 may then be received by the host website 140 at step 1020.

In various embodiments, optional steps 1025 to 1040, and 1055 (as shown in dotted outline) may be performed to enhance security.

At step 1025, in a manner similar to step 425 in FIG. 4A, the marketplace server 160 may generate a first data token. The marketplace server 160 may transmit the first data token to both the host website 140 and the extension module 182 at step 1030. The first data token may be received at the host website 140 and the extension module 182 at steps 1035 and 1040 respectively. Although step 1030 is illustrated as being sent as a separate message for ease of explanation, it will be understood that in various embodiments, the first data token may be transmitted together with the access data, resource locator, and/or data descriptor sent in step 1015.

At step 1045, the host website 140 may transmit the requested data identified by the data descriptor to the extension module 182. For example, the host website 140 may be able to determine the location of the extension module 182 using the resource locator. If step 1035 had been performed and a first data token had been received at the host website 140, the host website 140 may include the first data token with the data that is being transmitted at step 1045.

At step 1050, the extension module 182 may receive the requested data.

If the optional security steps of generating and transmitting the first data token at steps 1025 and 1030 have been performed, the extension module 182 may be able to verify that the data received at step 1050 is authentic. For example, if the optional security steps are performed, the data received by the extension module 182 at step 1050 may include a "second data token".

In the context of FIG. 10, the term "second data token" refers to a data token that may accompany the data received by the extension module 182 at step 1050. From the perspective of the extension module 182, the second data token is purported to be legitimate (e.g., having originated from the marketplace server 160). However, step 1055 (as shown in dotted outline) may need to be performed to verify the legitimacy of the second data token.

At step 1055, the second data token is verified against the first data token (as received by the extension module 182 at step 1040) by determining if the second data token matches the first data token. In situations where the transmitted data is from a host website 140 that has been legitimately authorized by the marketplace server 160 to respond to the request of step 1005 (e.g., a host website 140 that has received the first data token at step 1035 and transmitted the first data token to the extension module 182 at step 1045, such that the second data token is in fact the first data token), the verification will be successful. In other situations, the extension module 182 may receive the second data token from another device that has not obtained legitimate authorization from the marketplace server 160 to respond to the request at step 1005, such that the second data token is illegitimate (e.g., the second data token may be forged or expired). In such case, the second data token will not match the first data token. This latter scenario may arise, for example, if a nefarious device attempts to trick the extension module 182 into accepting faulty data.

If the second data token matches the first data token, then the extension module 182 may be assured that the requested data accompanying the second data token is authentic. That is, the inclusion of a data token (that matches the first data token) with the data transmitted at step 1045 allows the host website 140 to prove to the extension module 182 that the data it is sending corresponds to the data that the extension module 182 requested from the marketplace server 160 at step 1005.

As illustrated in FIG. 10, at step 1015, the marketplace server 160 relays the request to access data from the extension module 182 to the host website 140. As discussed above, the relayed request may include a resource locator that allows the host website 140 to directly transmit the requested data to the extension module 182 at step 1045. In variant embodiments, however, the relayed request at step 1015 may not include the resource locator at all. In such embodiments, the host website 140 may not transmit the requested data directly to the extension module 182. Instead, the host website 140 may simply transmit the requested data to the marketplace server 160, and the marketplace serer 160 may then further relay the requested data back to the extension module 182.

Figure 13A:
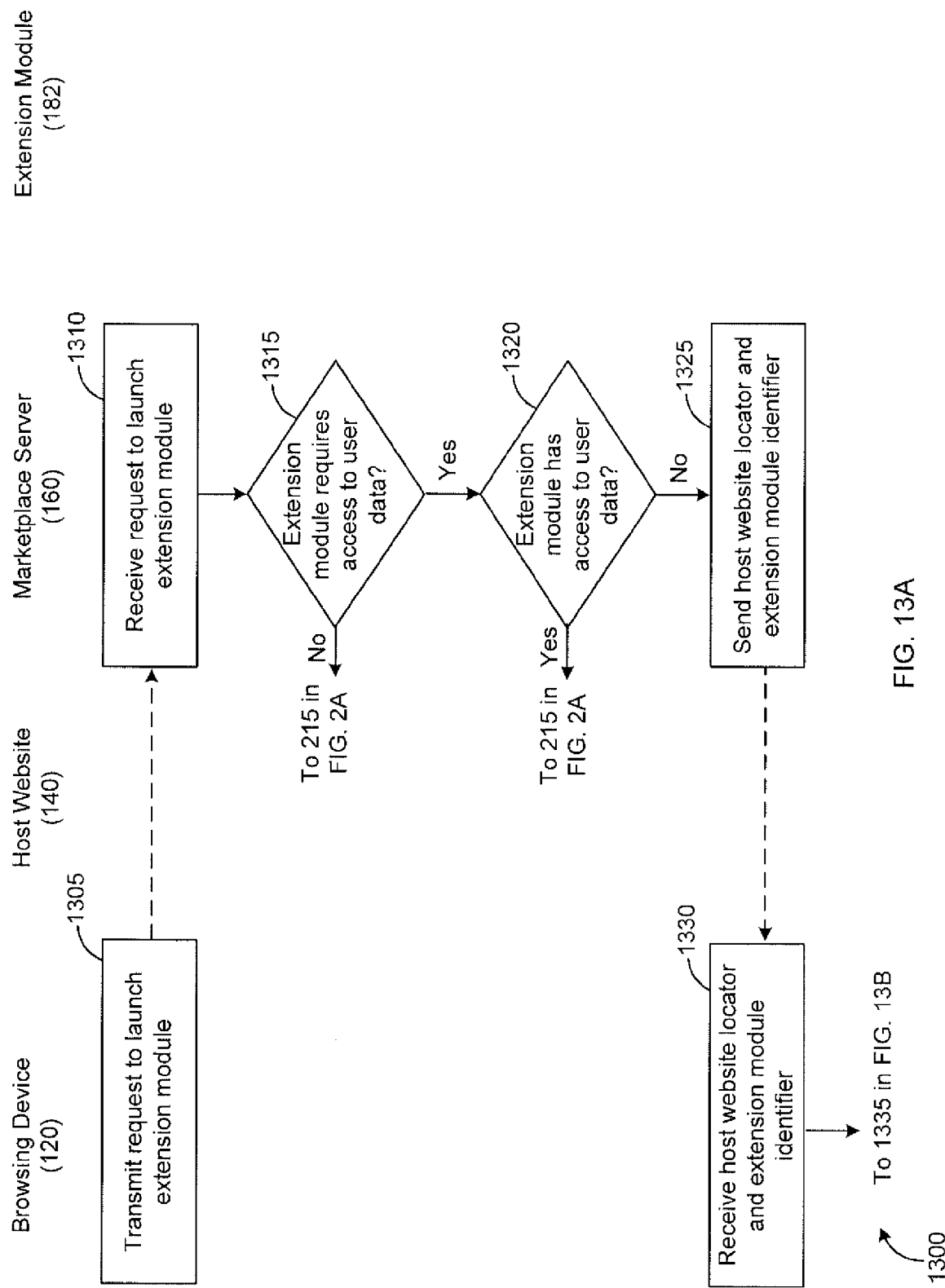
FIGS. 13A and 13B are flowchart diagrams for a method of providing access to an extension module in accordance with another example embodiment.
Figure 13B:
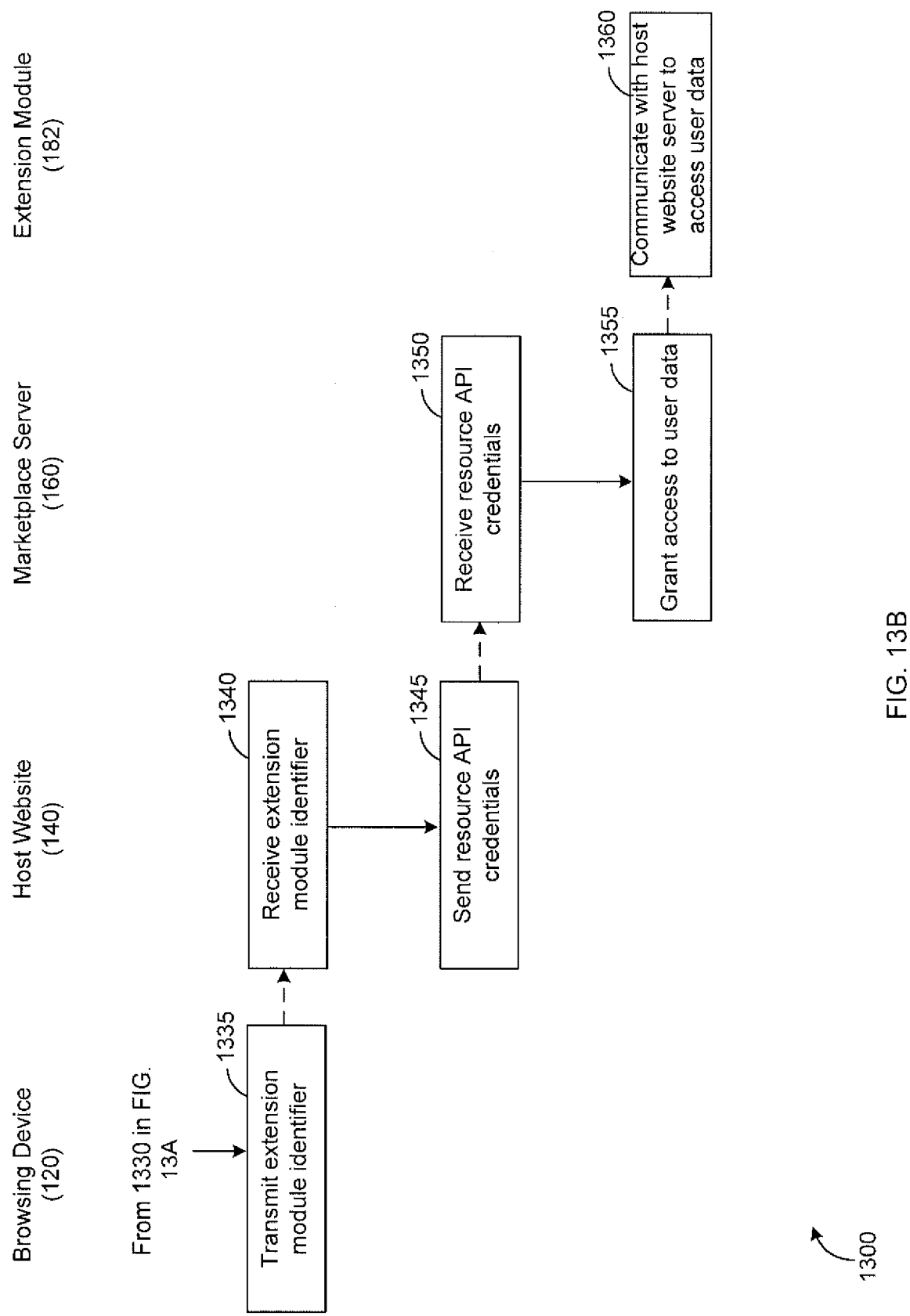

Marketplace Server Providing an Extension Module Access to User Data of the Host Website Based on User Permission Referring to FIGS. 13A and 13B, shown there generally as 1300 are flowchart diagram for a method of providing access to an extension module to user data of host website based on user permission, in accordance with an example embodiment. Reference will simultaneously be made to the components of FIG. 1.

In various situations, an extension module 182 launched by a browsing device 120 may require access to user data stored on host website server 140. The user data is stored in user information database 144 located on the host website server 140, and may include user authentication information and/or other data associated with the registered user accounts.

As illustrated, at step 1305, the browsing device 120 transmits a request to launch an extension module 182 to the marketplace server 160. This request is received by the marketplace server 160 at step 1310.

At step 1315, the marketplace server 160 determines whether the extension module 182 requires access to user data stored on the host website server 140. If the user data is not required by the extension module 182 (the 'NO' branch), the marketplace server 160 provides the browsing device 120 with an authentication token and a resource locator (for example, a URL or IP address) for the extension module 182.

In this example embodiment, the marketplace server 160 provides the browsing device 120 with the authentication token and the resource locator to launch the extension module 182 according to steps 215 to 265 of FIG. 2A. In some other embodiments, the marketplace server 160 may provide the browsing device 120 with the authentication token and the resource locator to launch the extension module 182 according to steps 215 to 265 of FIG. 2B, steps 315 to 265 of FIG. 3A or steps 315 to 265 of FIG. 3B.

If the user data is required by the extension module 182 (the 'YES' branch), the marketplace server 160 determines whether the extension module 182 already has access to user data (step 1320). If the extension module 182 already has access to user data (the 'YES' branch), the marketplace server 160 provides the browsing device 120 with an authentication token and a resource locator (for example, a URL or IP address) for the extension module 182.

In this example embodiment, the marketplace server 160 provides the browsing device 120 with the authentication token and the resource locator to launch the extension module 182 according to steps 215 to 265 of FIG. 2A. As mentioned above, in some other embodiments, the marketplace server 160 may provide the browsing device 120 with the authentication token and the resource locator to launch the extension module 182 according to steps 215 to 265 of FIG. 2B, steps 315 to 265 of FIG. 3A or steps 315 to 265 of FIG. 3B.

If the extension module 182 does not have access to the user data (the 'NO' branch), the marketplace server 160 transmits host website locator and extension module identifier to the browsing device 120 at step 1325, which is received by the browsing device 120 at step 1330. The host website locator may be a URL or an IP address for the host website 140.

Referring now to FIG. 13B, the method 1300 of FIG. 13A continues at step 1335. At step 1335, the browsing device 120 grants its permission to have the extension module 182 access the user data from the host website server by calling the host website 140 and providing the extension module identifier to the host website 140. As illustrated, at step 1335, the browsing device 120 transmits the received extension module identifier to the host website 140 using the received host website locator.

At step 1340, the host website 120 receives the extension module identifier from the browsing device 120. In response, at step 1345, the host website 120 transmits resource API credentials for the resource API 148 implemented by the host website server 140 to the marketplace server 160. As previously mentioned, the host website server 140 may implement a resource API that provides as interface for external software modules, such as the extension module server 180, to access resources available on the host website server 140. At step 1350, the resource API credentials are received by the marketplace server 160.

At step 1355, the marketplace server 160 grants access to the extension module 182 to the user data stored on the host website server 140. At step 1360, the extension module 182 communicates with the host website server 140 to access user data.

Reference is next made to FIG. 14 illustrating a flowchart diagram for a method of accessing user data from a host device in accordance with an example embodiment.

At step 1405, the browsing device transmits request to access or launch extension module 182. This request is received by the marketplace server 160 at step 1410. In some other situations, the method may begin with the extension module 182 requesting access to user data stored on the host website server 140. The extension module 182 may send this request to marketplace server 160.

At step 1415, the marketplace server 160 determines whether the browsing device 120 or the user associated with the browsing device 120 has approved extension module 182 to access user data from the host website server 140. If the browsing device 120 has not approved the extension module 182 to access user data from the host website server 140 (the 'NO' branch), the extension module 182 is refused access at step 1420.

If the marketplace server 160 determines that the browsing device 120 has granted access to the extension module 182 to access user data (the 'YES' branch), the marketplace server 160 transmits resource API credentials (corresponding to the host website server 140), user identifier (as used by the host website 140 to authenticate the user for the user-authenticated browsing session) and an approval message at step 1425.

At step 1430, the extension module 182 proceeds to access user data from host website server 140.

Marketplace Server Providing a Host Website Access to Data of the Extension Module In various situations, the host website 140 may be configured to request data from the extension modules 182 that the host website 140 is associated with. For example, a host website 140 may do this to determine if a given extension module 182 is available to be accessed. Additionally or alternatively, the host website 140 may access additional data or content that is made accessible by the extension module 182. As discussed above with respect to FIGS. 4A and 4B, the various example data items that may be exchanged between a host website 140 and an extension module 182 may conform to pre-established data types (e.g., messages, reviews, instructions, etc.). For example, the host website 140 may be a website that provides food information, and the extension module 182 may provide access to additional recipes for creating baked goods. The host website 140 may thus request the recipe data from the extension module 182 to make it available to the users of the host website 140.

Figure 11:
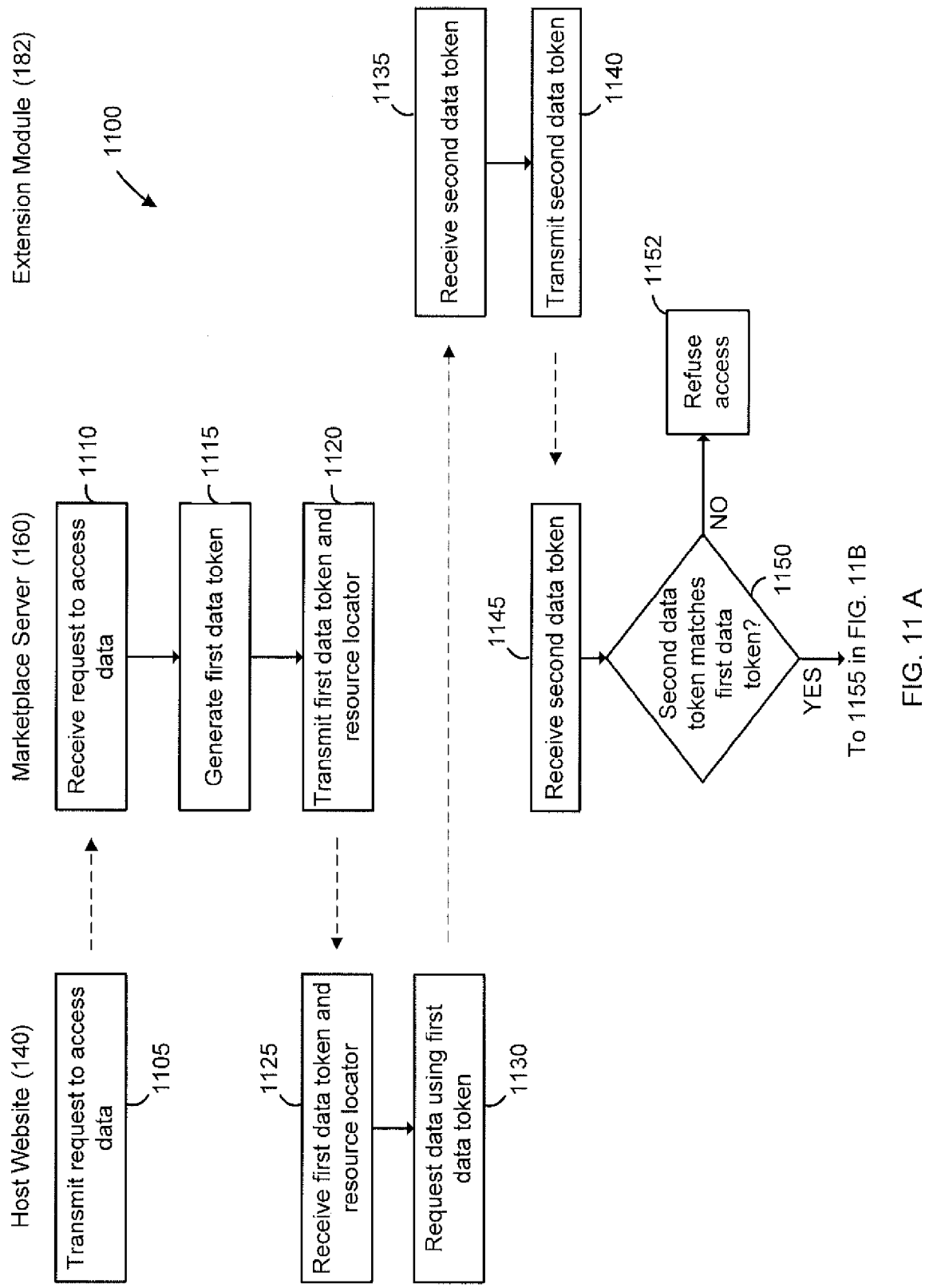
FIGS. 11A and 11B are flowchart diagrams for methods of processing a request from a host website for data stored on an extension module in accordance with an example embodiment.
Figure 11:
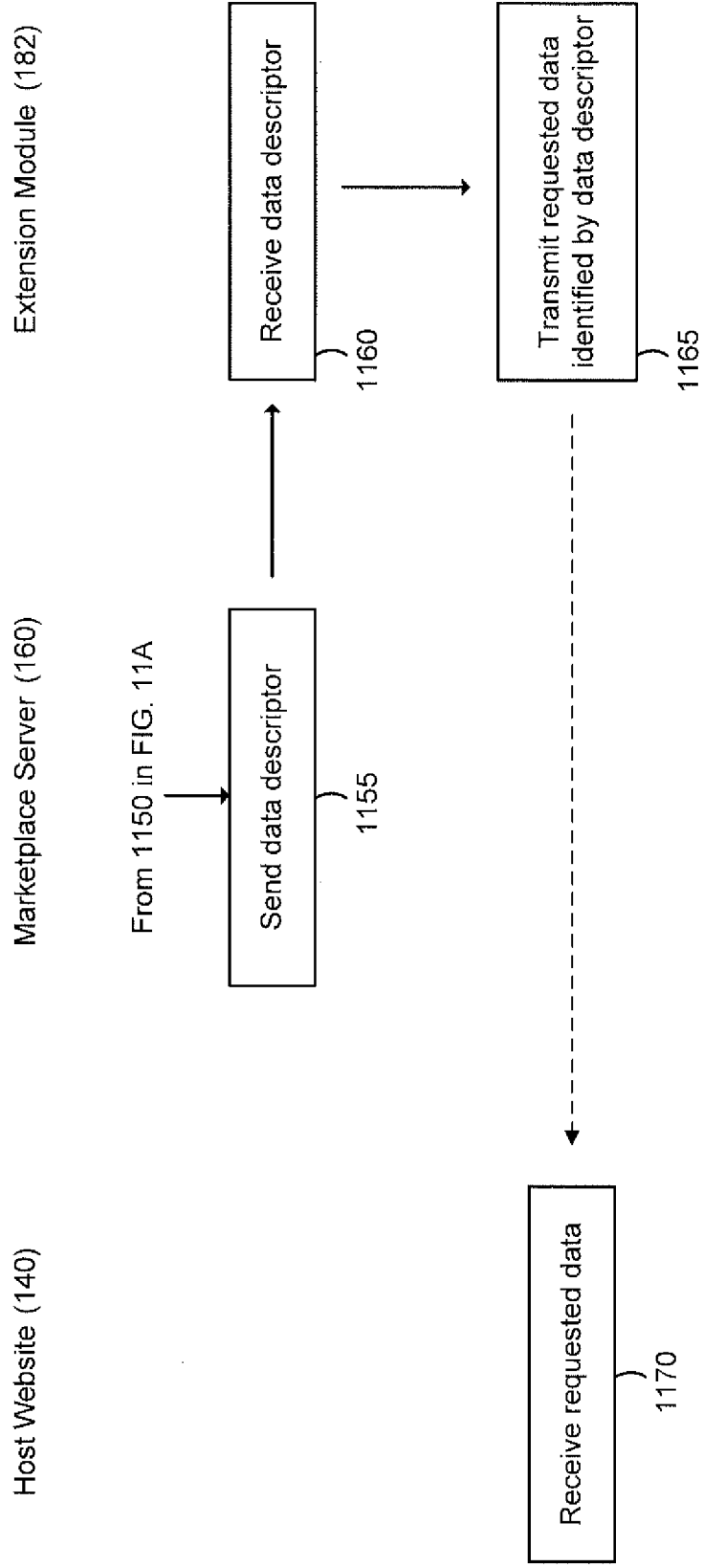

Referring to FIGS. 11A and 11B, shown there generally as 1100 are flowchart diagrams for a method of providing a host website access to data of the extension module, in accordance with an example embodiment. It will be understood that some of the steps shown in FIGS. 11A and 11B may be similar to the steps shown in FIGS. 4A and 4B, except that instead of the extension module 182 requesting data from the host website 140, it is the host website 140 requesting data from the extension module 182. In discussing FIGS. 11A and 11B, reference will simultaneously be made to the components of FIG. 1.

At step 1105, the host website 140 may send a request for data to the marketplace server 160. The request may include an identifier for the extension module 182 that the host website 140 is attempting to request data from. This request for data may be received at the marketplace server 160 at step 1110.

While not illustrated in FIG. 11A, the marketplace server 160 may use the identifier for the extension module 182 to determine if the host website 140 has access to the data that it is requesting. For example, this may involve the marketplace server 160 performing a lookup into a database (or other equivalent data store) that allows the marketplace server 160 to determine the extension modules 182 that the host website 140 is associated with. If the marketplace server 160 determines that the host website 140 should not have access to the data it is requesting, it may not proceed to the next steps.

At step 1115, the marketplace server 160 may generate a first data token, and at step 1120, the marketplace server may transmit the first data token and a resource locator (that allows the host website 140 to determine how to communicate with the extension module 182) to the host website 140. As in the scenarios discussed above, the first data token may be a randomly generated cryptographic value that is difficult for another party to reproduce, such that the first data token may subsequently be used by the host website 140 to prove that it has obtained authorization from the marketplace server 160 to access the requested data stored on the extension module 182.

At step 1125, the host website 140 may receive the first data token and the resource locator. At step 1130, the host website 140 may then transmit the first data token to the extension module 182 located by the resource locator.

At step 1135, the extension module 182 may receive a data token. In the typical scenario where the host website 140 attempts to access the extension module 182 in a legitimate fashion, the data token may be the first data token transmitted by the host website 140 at step 1130. In other scenarios, the extension module 182 may receive the data token from another device that has not obtained legitimate authorization from the marketplace server 160, such that the data token may be illegitimate (e.g., the data token may be forged or expired). In the context of FIG. 11A, the term "second data token" generally refers to the data token received by the extension module 182 at step 1135. From the perspective of the extension module 182, the second data token is purported to be legitimate. However, steps 1140 to 1150 may need to be performed to verify whether the "second data token" is, in fact, legitimate.

To validate the second data token, the extension module 182 may transmit the second data token to the marketplace server 160 at step 1140.

At step 1145, the marketplace server 160 may receive the second data token from the extension module 182.

At step 1150, the marketplace server 160 may verify whether the second data token received from the extension module 182 at step 1145 matches the first data token generated at step 1115. If the second data token does not match the first data token (the 'NO' branch where verification is unsuccessful), then the marketplace server 160 may indicate to the extension module 182 that the second data token received by the extension module 182 at step 1135 is not valid (e.g., that the device that transmitted the second data token to the extension module 182 should be refused access (step 1152)).

If the second data token matches the first data token (the 'YES' branch at step 1150 where verification is successful), the method 1100 of FIG. 11A may proceed to step 1155 in FIG. 11B.

Referring now to FIG. 11B, at step 1155, the marketplace server 160 may send a data descriptor to the extension module 182 for the data that the host website 140 is requesting. The data descriptor may be generated based on information received in the request for data at step 1110 of FIG. 11A. The data descriptor may be received at the extension module 182 at step 1160.

At step 1165, the extension module 182 may then transmit the requested data that is identified by the data descriptor to the host website 140. The requested data may be received by the host website 140 at step 1170.

Figure 12:
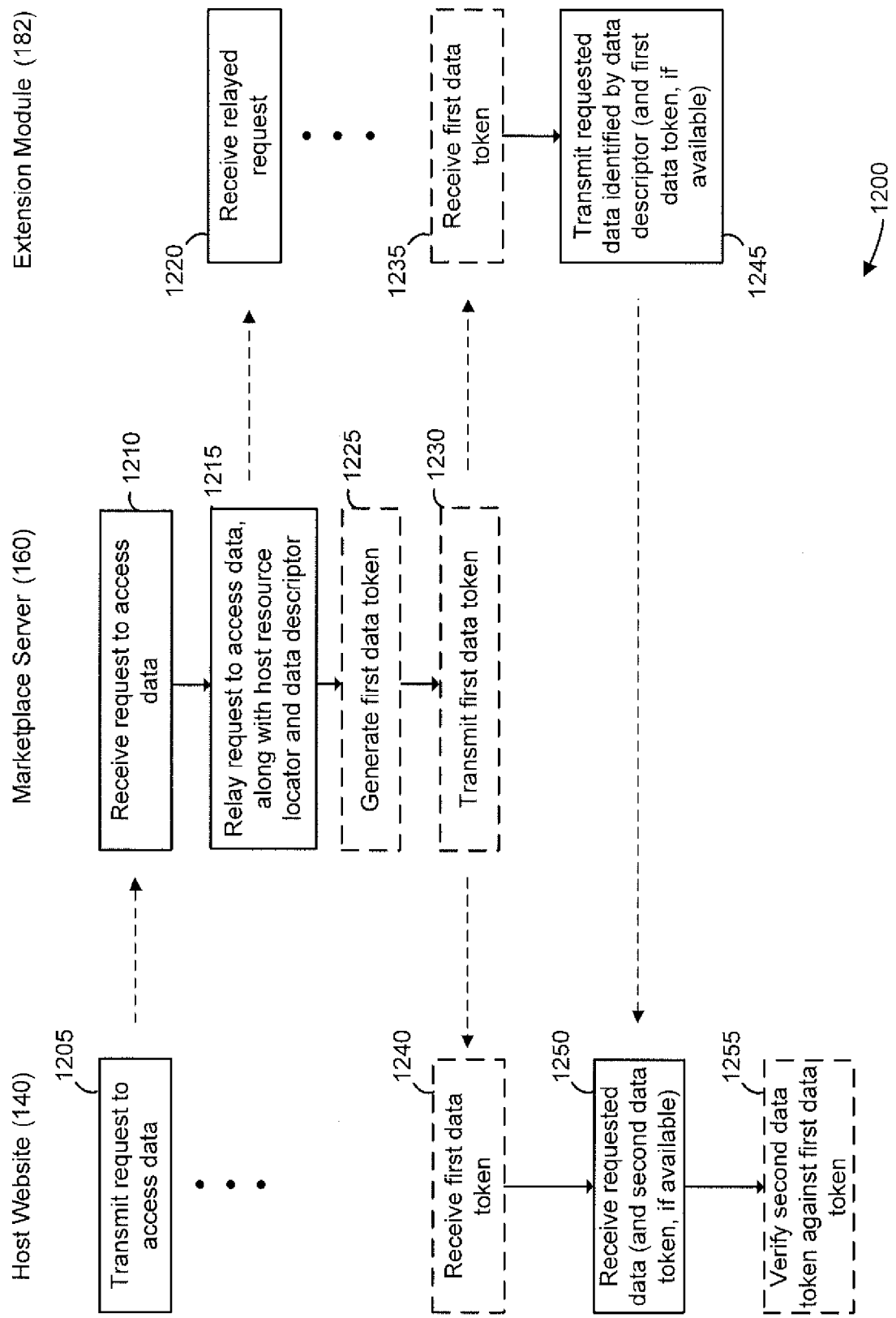
FIG. 12 is a flowchart diagram for a method of processing a request from a host website for data stored on an extension module, in accordance with another example embodiment.

Referring to FIG. 12, shown there generally as 1200, is a flowchart diagram for a method of processing a request from a host website for data from an extension module, in accordance with another example embodiment. The method illustrated in FIG. 12 may serve a similar purpose as the method shown in FIGS. 11A-11B, in that the marketplace server 160 may provide a host website 140 access to data of the extension module 182. However, in the method illustrated in FIG. 12, instead of the marketplace server 160 returning a token to the host website 140 so that the host website 140 can directly request the data from the extension module 182, the marketplace server 160 relays the request to the extension module 182. In discussing FIG. 12 below, reference will simultaneously be made to the components of FIG. 1.

Viewed another way, the steps in the method of FIG. 12 may also be considered to be similar to the method shown in FIG. 10 in that the marketplace server 160 performs steps to relay a request to access data. The difference between the method of FIG. 12 and the method of FIG. 10, however, is that the host website 140 requests data from the extension module 182 instead of the extension module 182 requesting data from the host website 140.

At step 1205, the host website 140 transmits a request to access data to the marketplace server 160. This request is received at step 1210. As with FIGS. 11A and 11B above, while not illustrated in FIG. 12, the marketplace server 160 may perform steps to verify that the host website 140 has access to the data that is requested.

At step 1215, the marketplace server 160 may relay the request to access data to the extension module 182. The request relayed to the extension module 182 may also include a data descriptor for the data that the host website 140 is requesting. Additionally, the relayed request may include a host resource locator that allows the extension module 182 to locate the host website 140 for communication. For example, the host resource locator may be a URL or an IP address for the host website 140.

The request relayed by the marketplace server 160 may then be received by the extension module 182 at step 1220.

In various embodiments, optional steps 1225 to 1240, and 1255 (as shown in dotted outline) may be performed to enhance security.

At step 1225, the marketplace server 160 may generate a first data token. The marketplace server 160 may transmit the first data token to both the host website 140 and the extension module 182 at step 1230. The first data token may be received at the extension module 182 and the host website 140 at steps 1235 and 1240 respectively.

At step 1245, the extension module 182 may transmit the requested data identified by the data descriptor to the extension module 182. For example, the extension module 182 may be able to determine the location of the host website 140 using the host resource locator. If step 1235 had been performed and a first data token had been received at the extension module 182, the extension module 182 may include the first data token with the data that is being transmitted at step 1245.

At step 1250, the extension module 182 may receive the requested data.

If the optional security steps of generating and transmitting the first data token at steps 1225 and 1230 have been performed, the extension module 182 may be able to verify that the data received at step 1250 is authentic. For example, if the optional security steps are performed, the data received by the host website 140 at step 1250 may include a "second data token".

In the context of FIG. 12 the term "second data token" refers to a data token that may accompany the data received by the host website 140 at step 1250. From the perspective of the host website 140, the second data token is purported to be legitimate (e.g., having originated from the marketplace server 160). However, step 1255 (as shown in dotted outline) may need to be performed to verify the legitimacy of the second data token.

At step 1255, the second data token is verified against the first data token (as received by the host website 140 at step 1240) by determining if the second data token matches the first data token. In situations where the transmitted data is from an extension module 182 that has been legitimately authorized by the marketplace server 160 to respond to the request of step 1205 (e.g., an extension module 182 that has received the first data token at step 1235 and transmitted the first data token to the host website 140 at step 1245, such that the second data token is in fact the first data token), the verification will be successful. In other situations, the host website 140 may receive the second data token from another device that has not obtained legitimate authorization from the marketplace server 160 to respond to the request at step 1205, such that the second data token is illegitimate (e.g., the second data token may be forged or expired). In such case, the second data token will not match the first data token. This latter scenario may arise, for example, if a nefarious device attempts to trick the host website 104 into accepting faulty data.

If the second data token matches the first data token, then the host website 140 may be assured that the requested data accompanying the second data token is authentic. That is, the inclusion of a data token (that matches the first data token) with the data transmitted at step 1245 allows the extension module 182 to prove to the host website 140 that the data it is sending corresponds to the data that the host website 140 requested from the marketplace server 160 at step 1205.

As illustrated in FIG. 12, at step 1215, the marketplace server 160 relays the request to access data from the host website 140 to the extension module 182. As discussed above, the relayed request may include a host resource locator that allows the extension module 140 to directly transmit the requested data to the host website 140 at step 1245. In variant embodiments, however, the relayed request at step 1215 may not include the host resource locator at all. In such embodiments, the extension module 182 may not transmit the requested data directly to the host website 140. Instead, the extension module 182 may simply transmit the requested data to the marketplace server 160, and the marketplace serer 160 may then further relay the requested data back to the host website 140.

Initial Setup of Communication Amongst the Marketplace Server, Browsing Device, and Host Website The discussion above has been with regards to the marketplace server 160 controlling access: (i) of the browsing device 120 to the extension module (e.g., the methods of FIGS. 2 and 3), and (ii) of the extension module 182 to the data stored on the host website 140 (e.g., the method of FIGS. 4A and 4B). However, prior to the marketplace 160 even being able to present available extension modules 182 to the browsing device 120, communication must be established amongst the marketplace server, the browsing device and the host website.

Figure 5:
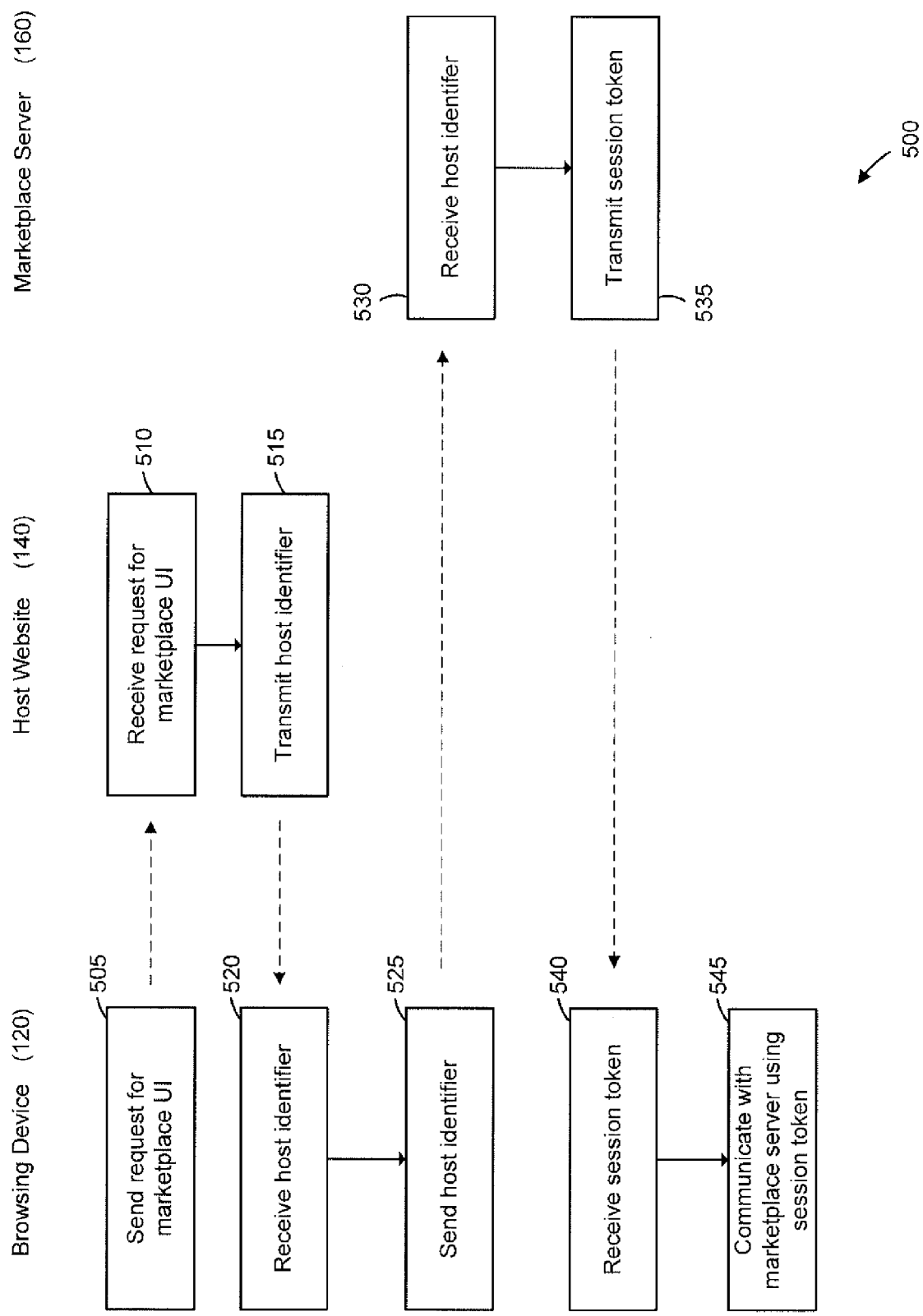
FIG. 5 is a flowchart diagram for methods of initializing communication among a browsing device, a host device, and a marketplace server according to an example embodiment.
Figure 6:
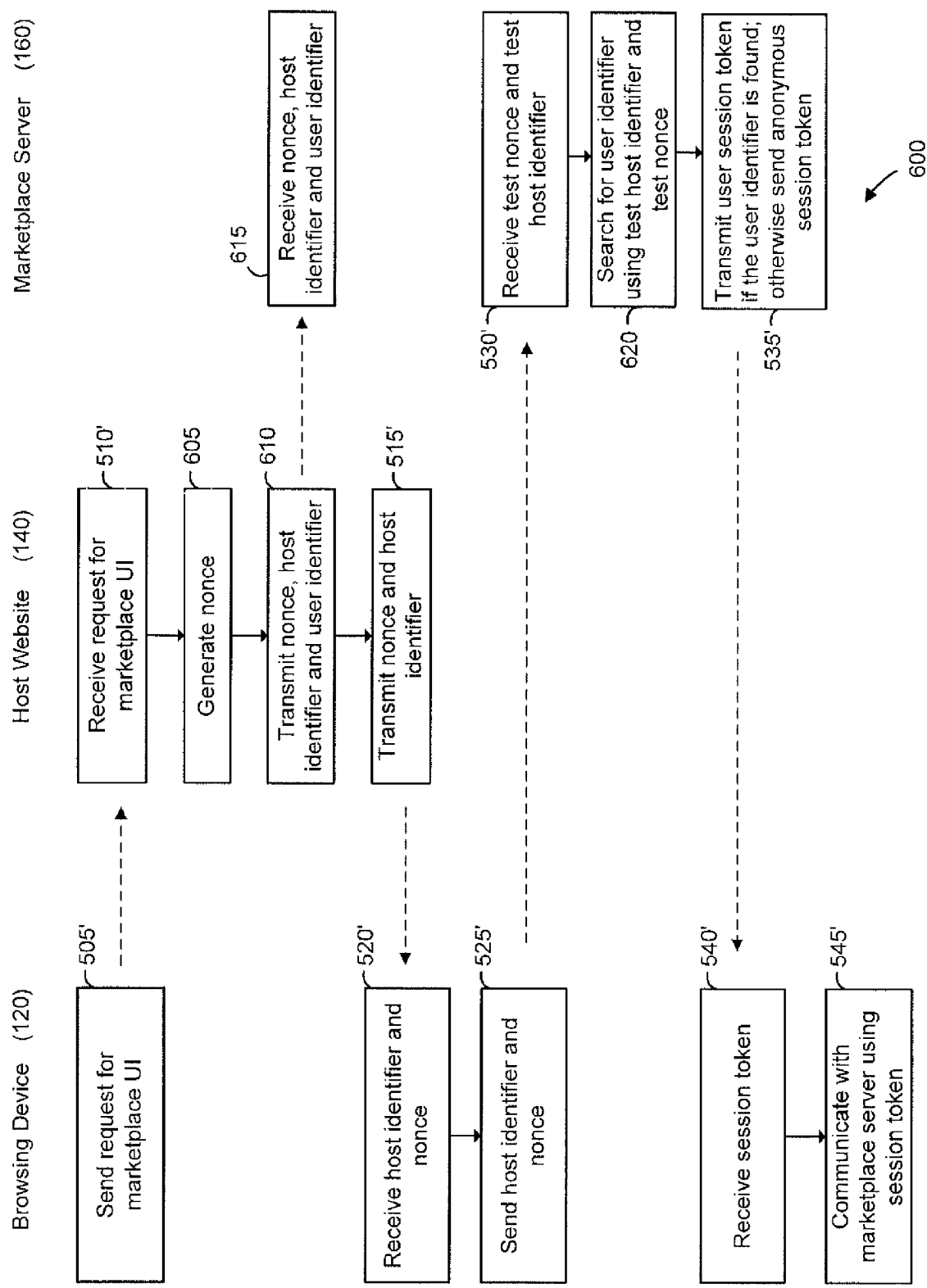
FIG. 6 is a flowchart diagram for methods of initializing the communications amongst a browsing device, a host website, and a marketplace server, in accordance with another example embodiment.

It will be noted that for the purposes of illustration, FIGS. 5 and 6 show embodiments in which a CORS-enabled browser application 122 (as shown in FIG. 1) is provided, such that the browsing device 120 may be able to communicate directly with the marketplace server 160. However, as discussed above, a non CORS-enabled browser application 122 (e.g., a browser application that enforces the 'same origin' policy, and may not be able to communicate with the marketplace server 160 directly) may also be used. In such case, for the communications shown in FIGS. 5 and 6 that are shown as being directly between the browsing device 120 and the marketplace server 160, the host website 140 may act as a proxy to relay messages between the browsing device 120 and the marketplace server 160.

Also, as explained below, FIG. 5 illustrates a simpler situation where the establishment of communication amongst the browsing device 140, host website 140 and marketplace server 160 is for the case where the browsing session between the browsing device 120 and the host website 140 is anonymous. FIG. 6 shows a more complicated scenario where the establishment of communication is for the case where the browsing session between the browsing device 120 and the host website 140 is a user-authenticated session.

Referring first to FIG. 5, shown there generally as 500 is a flowchart diagram for initializing the communications amongst the browsing device 120, the host website 140 and the marketplace server 160. Reference will also be made to the components in FIG. 1

At step 505, the browsing device 505 may send a request for the marketplace user interface (UI) to the host website 140. The host website 140 may receive this request at step 510. As explained above, the marketplace UI may display the different extension modules 182 available for the browsing device 120 to access in the context of the browsing device 120's browsing session with the host website 140.

At step 515, the host website 140 may transmit a host identifier to the browsing device 120. The host identifier may be a unique value used by the marketplace server 160 to identify a particular host website 140. The host identifier can be transmitted in a variety of ways. For example, the host identifier may be embedded into a webpage, stored in a cookie, etag, pixel tag or any other medium which allows the values to be stored transported.

As explained below, the marketplace 160 may subsequently use the host identifier to determine the extension modules that are available for use by the browsing device 120. The host identifier may then be received at step 520.

At step 525, the browsing device 120 may then send the host identifier to the marketplace server 160. The marketplace server may receive the host identifier at step 530. Based on this communication, the marketplace server 160 may be able to determine that the browsing device 120 would like to view the available extension modules 182 for the host website 140 associated with the host identifier.

At step 535, the marketplace server 160 may generate a session token and transmit it to the browsing device 120. The session token may be received at the browsing device at step 540.

The session token may be used by one or both of the browsing device 120 and the marketplace server 160 to identify the session between the marketplace server 160 and the browsing device 120 in which the marketplace server 160 provides marketplace UI to the browsing device 120.

At step 545, the browsing device 120 may communicate with the marketplace server using the session token received at step 540. This communication may result in the browsing device 120 retrieving the list of available extension modules 182 that it can access for the host website 140.

As noted, the method shown in FIG. 5 illustrates a simple example in which the original browsing session between the browsing device 120 and the host website 140 is anonymous. This may mean that the user has not 'logged in' to the host website 140 to set up any personalized data that can be tracked by the host website 140. For example, in the scenario where the host website 140 is a personal finance website, an authenticated user may be able set up a 'portfolio' or a 'watchlist' that stores a list of stocks that the user is interested in. In another example where the host website is a social media website, an authenticated user may have access to their social media contacts. An anonymous user who has not authenticated with the host website may not have access to this personalized data.

Referring to FIG. 6, shown there generally as 600 is a flowchart diagram for initializing the communications amongst the browsing device 120, the host website 140 and the marketplace server 160, in accordance with an embodiment of the present disclosure. The method of FIG. 6 may achieve a similar result as the method of FIG. 5, but the method of FIG. 6 may be for a scenario where the browsing session between the browsing device 120 and the host website 140 is a user-authenticated browsing session.

In FIG. 6, reference numerals to those in FIG. 5 are used where appropriate (e.g., step 505' in FIG. 6 is similar to step 505 in FIG. 5). However, reference numerals starting with a '6' (e.g., steps 605, 610, 615, and 620) do not have a corresponding step in FIG. 5, and are in illustrated FIG. 6 to address the user-authenticated browsing session.

At 505', the mobile device 120 may send a request for the marketplace UI to the host website 140. The request may then be received at step 510'. As will be understood, these steps may be performed in a manner that is similar to steps 505 and 510 respectively of FIG. 5.

At step 605, the host website 140 may generate a cryptographic nonce value. A cryptographic nonce value is an arbitrary (typically random) value that is used in secure communications generally to prevent replay attacks.

At 610, the host website 140 may transmit the following data items to the marketplace server 160: the nonce generated at step 605, the host identifier (as used by the marketplace server 160 to identify the host website 140), and the user identifier (as used by the host website 140 to authenticate the user for the user-authenticated browsing session). These data items may be received at the marketplace server at step 615. These data items may be stored at the marketplace server 160.

At step 515', the host website 140 may transmit the generated nonce and the host identifier (but not the user identifier) to the browsing device 120. As with step 515 in FIG. 5, the nonce and the host identifier can be transmitted in a variety of ways. For example, the nonce and host identifier may be embedded into a webpage, stored in a cookie, etag, pixel tag or any other medium which allows the values to be stored transported. The host identifier and nonce are received at the browsing device 120 at step 520'.

At step 525', the browsing device 120 may transmit the host identifier and nonce to the marketplace server 160 and at step 530', the marketplace server 160 may receive a test nonce and a test host identifier.

At step 620, the marketplace server 160 may search for a user identifier using the test nonce and test host identifier. The searching may be performed on the same storage medium that stored the host identifier, nonce, and user identifier received at step 615.

In a situation where the browsing device 120 has legitimately requested access to the marketplace server 160 from the host website 140, the test nonce and the test host identifier may be the same nonce and host identifier that was transmitted from the browsing device at step 525' (e.g., that which originated from the host website 140 at step 515'). Using this information, the searching at step 620 would be able to locate the corresponding user identifier because the marketplace server 160 would have stored the nonce and host identifier with the corresponding user identifier when these three data items were received (e.g., also from the host website 140) at step 615.

However, if the marketplace server 160 happens to receive the test nonce and the test host identifier from an illegitimate browsing device 120 (e.g., a device who may be trying to surreptitiously gain access to a user's data on the host website 140), the test nonce may be invalid and the searching at step 620 may not result in the finding any user identifiers.

At step 535', if the user identifier is found, a user session token is returned to the browsing device 120. If no user identifier is found, an anonymous session token (similar to the one transmitted at step 535 in FIG. 5) may be returned to the browsing device 120. The session token (either a user session token or an anonymous session token, as the case may be) is received at the browsing device 120 at step 540'.

At step 545', the browsing device 120 may communicate with the marketplace server 160 using the session token received at step 540'. For example, the marketplace server 160 may only allow access to a protected resource if the request was with respect to a user token. If the request was associated with an anonymous session token, the marketplace server 160 may only allow access to unprotected resources.

As noted above, the user identifier in the method of FIG. 6 is not transmitted to the browsing device 120 at step 515', such that the user identifier is not directly provided by the browsing device 120 to the marketplace server 160 to identify itself. Instead, a generated nonce is transmitted to the browsing device 120 (steps 515', 520'), which is then passed to the marketplace server 160 (steps 525', 530') so that the marketplace server 160 can look up the user identifier at step 620. This indirect method of providing a user identifier to the marketplace server 160 may protect the user identifier from being compromised. For example, since the actual user identifier is not actually provided to the browsing device 120, it is unlikely that a surreptitious party may be able to somehow steal the user identifier. Further, providing the nonce may prevent replay attacks by configuring the nonce to timeout after a period of time (e.g., such that if the marketplace server 160 does not receive the nonce from a browsing device 120 within a period of time, the nonce can no longer be used to lookup the user identifier for the browsing device 120).

While the methods illustrated in FIGS. 5 and 6 show the basic exchange of identifiers for the purpose of initializing communications amongst the browser device 120, host website 140, and marketplace server 160, it will be understood that additional data may be sent with the various transmissions that are shown.

For example, at step 515 of FIG. 5 and 515' of FIG. 6, the host website 140 may be configured to also transmit the webpage for the marketplace UI, which allows the browsing device 120 to retrieve the resources for displaying the marketplace UI. The webpage may, for example, include the various resource locators that are to be used by the browsing device to build the marketplace UI. In one example embodiment, upon receiving the webpage, the browsing application 122 on the browsing device 120 may commence downloading (or retrieving from a local cache) the page resources identified by the resource locators. The page resources may include a Cascading Styles Sheet (CSS) file containing style information, and a JavaScript file containing the code and functions for the embedded marketplace UI. In various embodiments, these marketplace resources may be hosted on the marketplace server 160, the host website 140 or other third party servers. There may also be embedded on the page, by the host website 140, a JavaScript tag intended to configure and initialize the marketplace UI. In an example embodiment, the JavaScript tag may look as follows:

```
<script type="text/javascript">
    marketplace(document).ready(function(marketplace) {
        marketplace{".embedded-app"}.platform({
            userToken:"${userToken}",
            hostId:"${hostId}",
            authCallback: function(currentUrl){window.location.href =
            "/login";},
            target: "${server}"
```

-continued

```
        });
    });
</script>
```

As will be understood by a skilled person, the above JavaScript block may provide: the location where the marketplace UI will be placed (e.g., the "embedded-app" class), the generated session token from FIGS. 5 and 6 (e.g., "${userToken}"), the host id (e.g., "${host id}"), a callback function which may be called by the marketplace UI in the event that an unauthenticated user attempts to access a protected resource (e.g., as shown, the call back function redirects the host website to the "/login" page of the host website at the "currentUrl"), and the server (e.g., "${server}") responsible for handling the marketplace UI requests. In the scenario where the web browser application 122 is CORS-enabled, the server may be the marketplace server 160.

In the scenario where the web browser application 122 is CORS-enabled, the marketplace server 160 may service the resource requests sent by the browsing device 120, and the requested data may be transmitted to the browsing device 120 along with CORS response headers. As will be understood by the skilled person, CORS response headers allow the browsing device 120 to ask the permission of the marketplace server 160 in order to access resources from a cross domain source. Permission may be given only if the hosting website 140 is within a domain white-list located on the marketplace server 160. If the hosting domain is not on the CORS domain white-list, the browsing device 120 may not allow the use of any data from the marketplace server 160.

As noted, in the scenario where the web browser application 122 on the browsing device is not CORS-enabled, the host website 140 may act as a proxy and relay communications between the browsing device 120 and the marketplace server 160. In various such embodiments, the host website 140 may be further configured to do more than just relay information to the browsing device 120. For example, the host website 140 may be configured to communicate directly with the marketplace server 160 on behalf of the browsing device 120, without involving the browsing device 120. Since the host website 140 may already be in possession of the session token used by the marketplace server 160 to identify communications with the browsing device 120, as well as the host identifier that the host website 140 itself is using, the host website 140 may be able to communicate with the marketplace server 160 on behalf of the browsing device 120 without involving the browsing device 120. Accordingly, a JavaScript tag embedded into a webpage for initializing the marketplace UI that is provided by the host website 140 to a browsing device 120 may not need to contain fields for the host identifier (e.g., "${hostId}") or the session token (e.g., "${userToken}"). The example JavaScript tag for a non CORS-enabled web browser application 122 may thus look like:

```
<script type="text/javascript">
    marketplace(document).ready(function(marketplace) {
        marketplace(".embedded-app").platform({
            authCallback: function(currentUrl){window.location.href =
                "/login";},
            target: "${server}"
        });
    });
</script>
```

The fields in this JavaScript tag may be similar to the one shown above for the CORS-enabled web browser application, except that the session token and host identifier fields are no longer present.

A series of example screenshots in FIGS. 7-9 for a marketplace UI will now be discussed.

Referring to FIG. 7, shown there generally as 700 is an example screenshot of a marketplace UI that may be shown as being embedded on a host website. The host website 140 may provide access to the marketplace UI 762, which as illustrated shows the available extension modules 182 for the website 140 in a grid format. A number of example extension modules such as 'Stock Stats', 'Capital Hive', are shown. While the example marketplace UI in FIG. 7 is shown in a grid format, it will be understood that other visual formats for displaying extension modules 182 may also be possible.

Figure 8A:
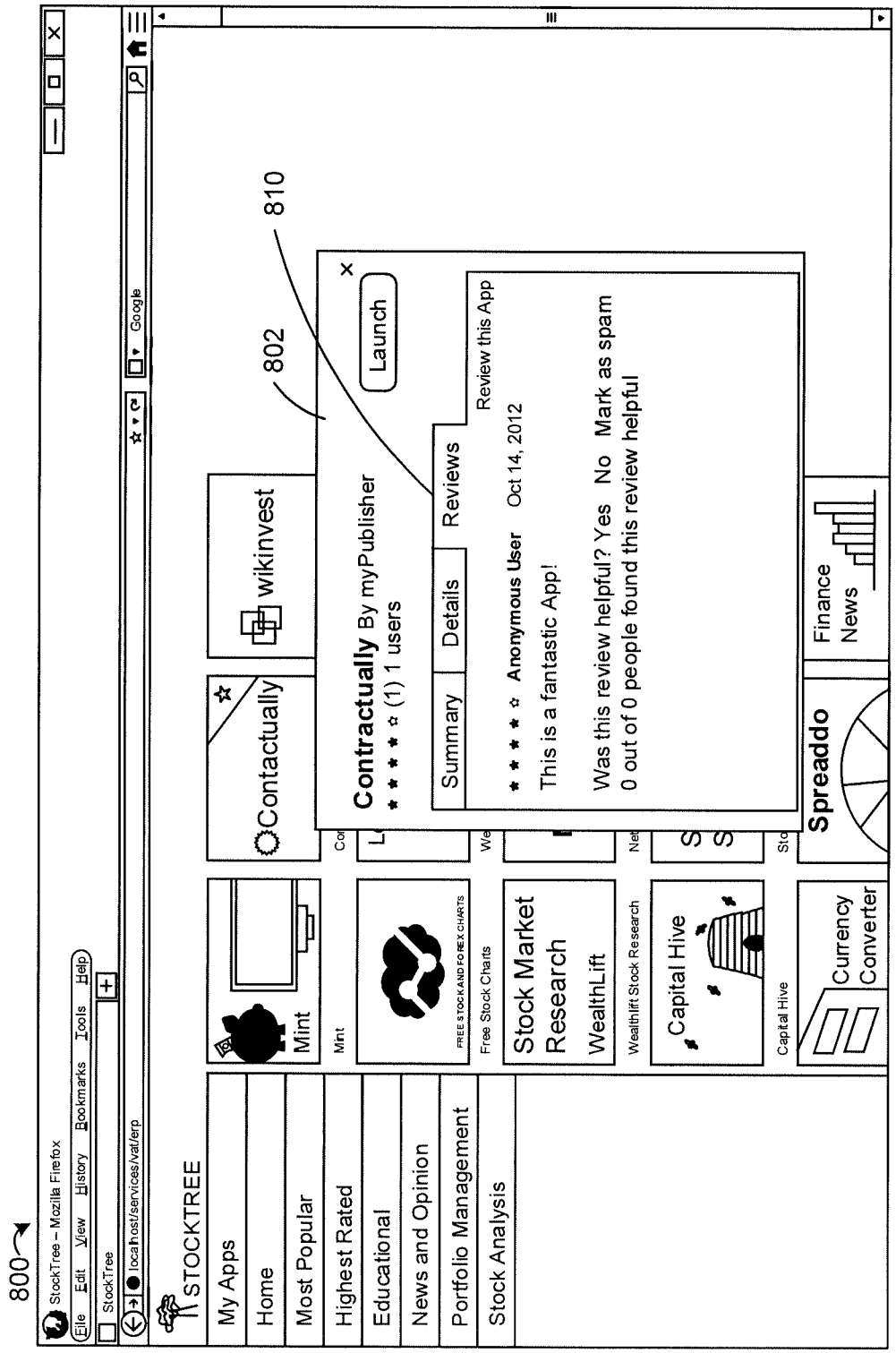
FIGS. 8A and 8B are screenshots of a user interface in accordance with another example embodiment.

Referring to FIG. 8A, shown there generally as 800 is an example screenshot of a marketplace UI after the marketplace UI receives input selecting a given extension module 182. As illustrated, a popup window 802 may be shown to provide information to the user. The popup window 802 may contain a number of different options that allow a user to learn more about the extension module 182. For example, there may be a number of tabs 'Summary', 'Details' and 'Reviews' that provide information about the extension module 182. As shown, the 'Reviews' tab 810 is selected for the 'Contractually' extension module 182.

Figure 8B:
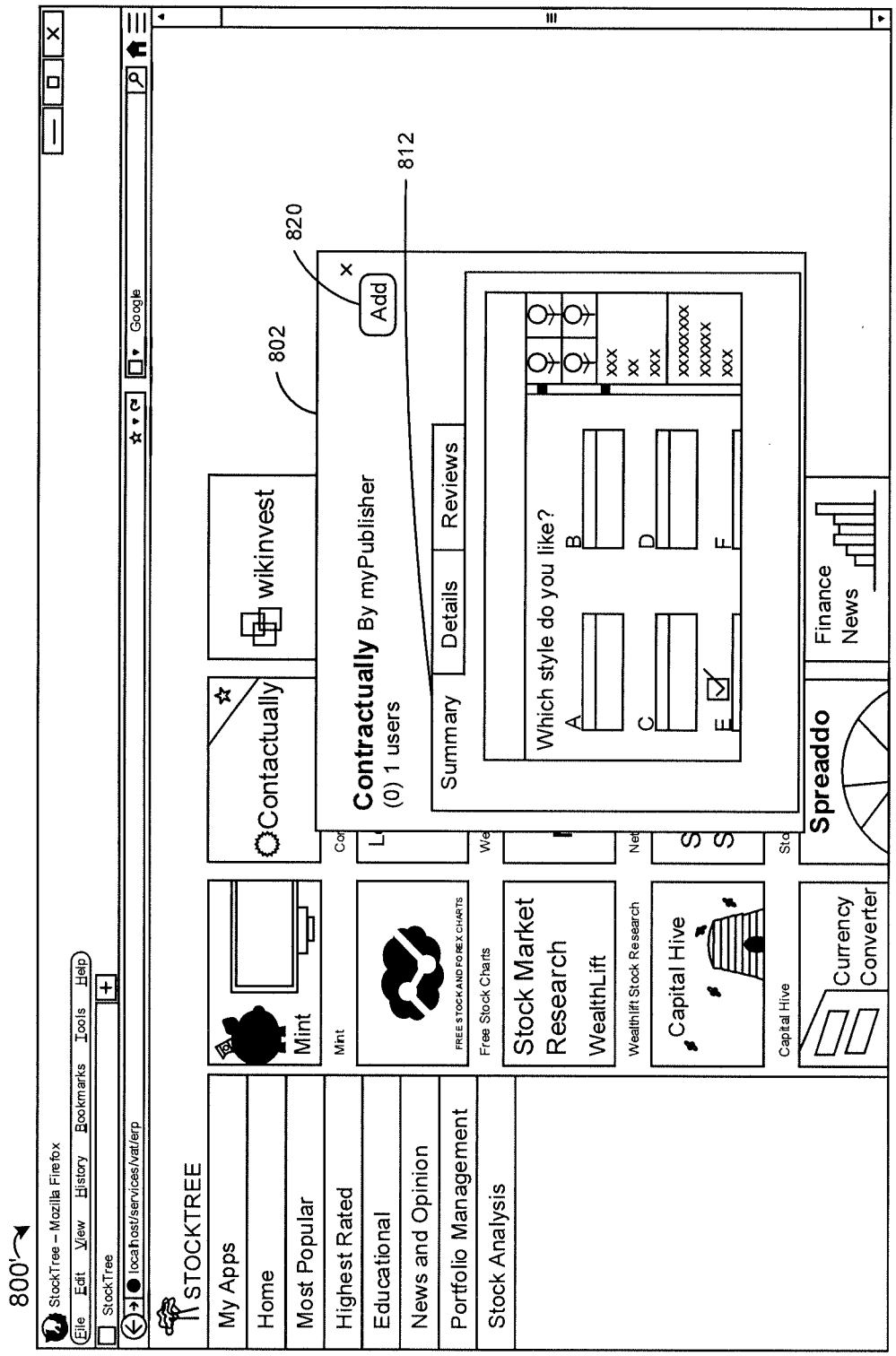

Referring to FIG. 8B, shown there generally as 800' is an example screenshot of a marketplace UI of a popup window 802 similar to the one shown in FIG. 8A, except that the 'Summary' tab 812 is shown. As illustrated, the contents of the 'Summary' tab 812 may provide a preview of the user interface that the extension module 182 provides. The popup window 802 may also provide a user-selectable option 820 that when selected, adds the extension module 182 for the browsing session between the browsing device 120 and the host website 140.

Referring to FIG. 9, shown there generally as 900 is an example screenshot that may be displayed after the user-selectable option (e.g., option 820 in FIG. 8B) to add an extension module is selected. As shown, a further popup window 902 may be shown to the user that asks the user to confirm that they would like to add the extension module 182. The popup window 902 may contain a list of the data items of the host website 140 that the extension module 182 requires access to (e.g., as illustrated, this data includes the 'Watchlist' and 'Portfolio' data items of a personal finance host website 140) that the user may approve access to as a condition of adding the extension module 182.

Installing the Marketplace Server for Use with a Host Website

It has been assumed in the discussion above that secure communications may take place between the host website 140 and the marketplace server 160. Details about how secure communications between these two devices may be established will now be discussed. When the marketplace server 160 is first installed to be used with a host website 140, the host website 140 may be given a unique host identifier (the use of which has been discussed above). The marketplace server 160 may also generate, and provide the host website 140 with, a cryptographically strong secret value. In a manner similar to a username and password pair, the host identifier and secret value may then be used by the host website 140 to subsequently authenticate with the marketplace server 160. Communications between the marketplace server 160 and the host website 140 may also be encrypted (e.g., using known encrypted communications technologies such as Secure Sockets Layer (SSL)).

Registering an Extension Module with the Marketplace Server

With respect to the marketplace server 160 and the extension module 182, when an extension module 182 is first registered to be available on the marketplace server 160, the extension module 182 may be given a unique extension module identifier. In various embodiments this identifier may be called an application identifier. The marketplace server 160 may also generate, and provide the extension module 160 with, a cryptographically strong secret value. In a manner similar to a username and password pair, the extension module identifier and secret value may then be used by the extension module 182 to subsequently authenticate with the marketplace server 160. Communications between the marketplace server 160 and the extension module 182 may also be encrypted (e.g., using known encrypted communications technologies such as Secure Sockets Layer (SSL)).

Additionally, an extension module 182 may be associated with a classification or category, so that the extension module 182 may be displayed properly in the marketplace UI. For example, as indicated above, this may prevent an extension module 182 directed towards nutrition from appearing on a personal finance website.

Further, as noted above, in various embodiments, the extension module 182 may be considered an application or "app" that may be selected to be added by a user of the browsing device 120 when they are accessing the host website 140. The marketplace server 160 may thus be considered to be an application store where users are able to explore, purchase, and/or download available extension modules 182. During registration of an extension module 182 for use with the marketplace server 160, the provider of the extension module 182 may be able to specify the pricing of the extension module 182. For example, the provider of the extension module 182 may specify that the extension module 182 can be downloaded completely free of charge, free of charge only for a period of time, for a specific price, and/or on a subscription basis. The browsing device 120 may then be presented with these options when viewing available extension modules 182 for a given host website 140. The marketplace server 160 may also be configured to receive payment information, if needed.

Payment Processing for Purchased Extension Modules

Figure 15B:
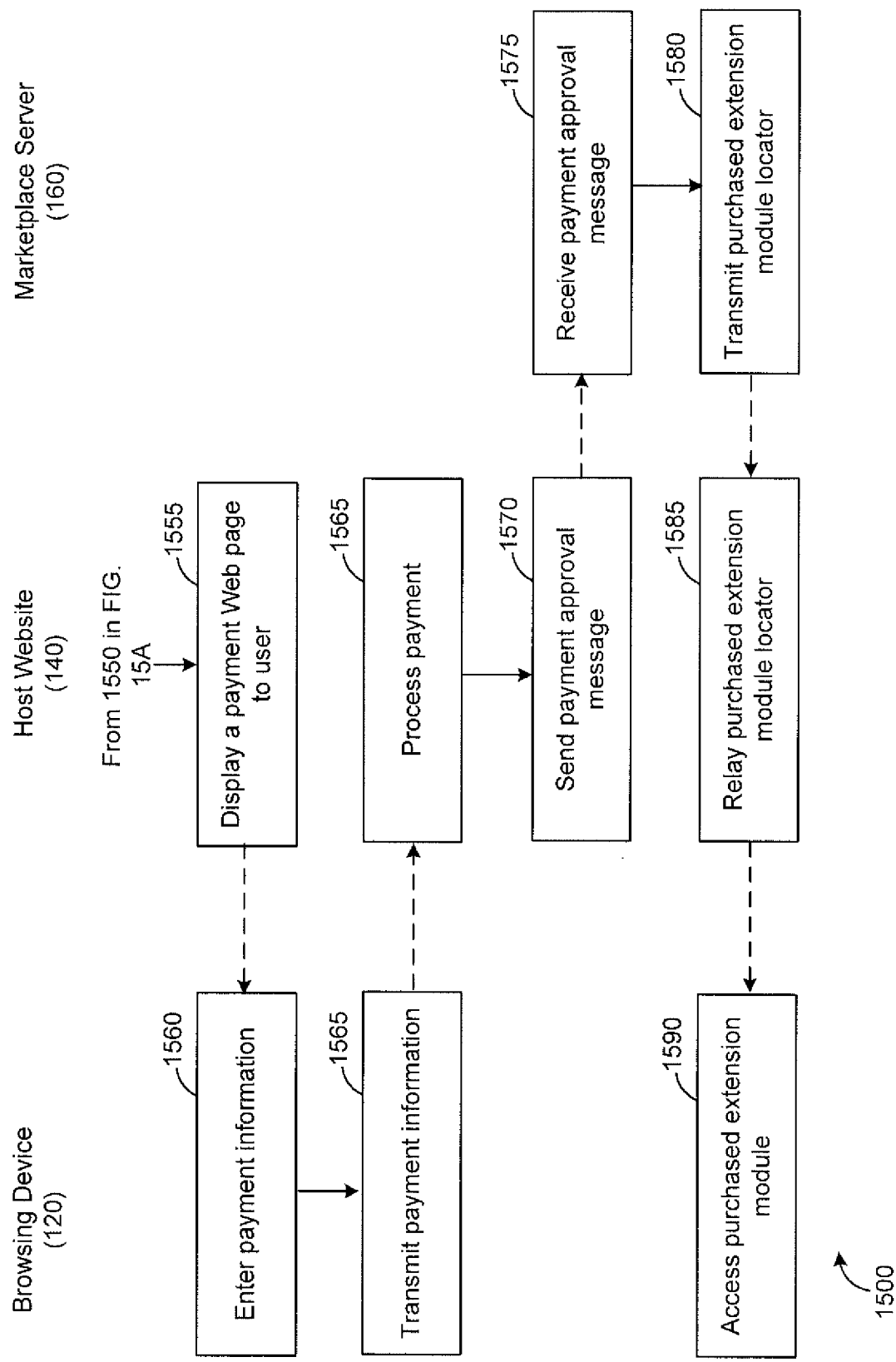

In various embodiments, the marketplace server 160 and the host website server 140 facilitate processing of payment made by the user to purchase extension modules 182. FIGS. 15A and 15B illustrate flowchart diagrams for a method of processing payment by a host website server 140 in accordance with an example embodiment.

At step 1505, the browsing device 120 transmits a request to purchase an extension module 182 to the marketplace server 160. The request is received by the marketplace server 160 at step 1510.

In response, the marketplace server 160 generates a payment token at step 1515. The payment token may be a randomly generated cryptographic value that is difficult for another party to reproduce. The payment token and a host website locator (for example, a URL or an Internet Protocol (IP) address for the host website 140) are transmitted by the marketplace server 160 to the browsing device 120 at step 1520.

The payment token and the host website locator are received by the browsing device 120 at step 1525. At step 1530, the user calls the host website 140 using the host website locator and transmits the payment token to the host website 140.

The host website 140 relays the payment token and a request for payment details associated with the payment token to the marketplace server 160 at step 1535. Payment details may include information related to purchasing of the extension module 182, such as, cost of purchasing the extension module 182, any additional one-time or recurring fee amounts associated with the extension module 182 etc.

Upon receiving the payment token and the request for payment details from the host website 140, the marketplace server 160 retrieves the payment details at step 1540, which are then transmitted to the host website 140 at step 1545. The payments details are received by the host website server 140 at step 1550.

The method continues at step 1555 in FIG. 15B. At step 1555, the host website server 140 displays a payment web page to the user at the browsing device 120. The payment web page allows the user to enter billing or payment information to finalize the purchase of the extension module 182. As illustrated, the user enters payment information on the payment web page at step 1560, and the entered payment information is transmitted to the host website server 140 from the browsing device 120 at step 1565. The browsing device 120 may transmit the payment information to the host website server 140 after the user confirms that the user wants to proceed with the purchase, for example, by clicking on an 'Accept' button on the payment web page.

In some other situations, the payment web page may be pre-populated with payment details. The host website 140 may pre-populate the payment web page based on relevant user information previously stored on the host website server 140. In such situations, the user indicates his intention to proceed with the purchase of the extension module 182 by accepting the pre-populated billing information on the payment web page.

At step 1565, the payment is processed by the host website server 140. Once the payment is processed, the host website server 140 generates and transmits a payment approval message for the marketplace server 160 at step 1570. The payment approval message indicates that the payment has been successfully made.

Upon receiving the payment approval message at step 1575, the marketplace server 160 transmits a locator (for example, a URL) of where the purchased extension module 182 can be accessed, at step 1580. The purchased extension module locator redirects the browsing device 120 to the purchased extension module 182.

At step 1585, the host website server receives and relays the extension module locator to the browsing device 120. The browsing device accesses the purchased extension module at step 1590, using the purchased extension module locator.

Marketplace Server Performing Error Detection

In various embodiments, the marketplace server 160 may perform one or more tests on submitted extension modules, or when the marketplace 160 is being installed to be used with a host website 140. These tests may validate that the entities providing the host website 140 or the extension module 182 conform to acceptable standards. Tests may be performed upon during initial installation of the marketplace server 160 or registration of the extension module 182. As well, tests may be performed periodically during the lifetime of the extension module 182 or the host website 140, in order to validate the entity and to ensure the availability and smooth operation of the marketplace server 160. The various tests may be for one or more of: errors, unavailable links, high latency, viruses, worms, trojan horses, adware, malware or any other problem that might adversely affect the operation of the marketplace server 160.

In various embodiments, the a host website 140 or an extension module 182 may be configured to automatically report errors and statistics to the marketplace server 160 for troubleshooting purposes during the normal course of operation. The marketplace server 160 may monitor error and statistics data in order to detect and help troubleshoot any problems that may arise.

Some of the errors that may be submitted to the marketplace server 160 for monitoring include (but are not limited to): resource request errors, authentication errors or marketplace communication errors. Some statistics that may be submitted to the marketplace server 160 for monitoring include (but are not limited to): resource request latency, authentication latency or marketplace communication latency.

Marketplace Server Providing a User Interface that Allows Setup of Host Websites and Extension Modules In various embodiments, the marketplace server 160 may provide a website that allows an operator of a host website 140 and/or a provider of an extension module 182 to submit their respective requests to the marketplace server 160. The marketplace server 160 website user interface may provide the operator and/or provider with key details about their host website 140 or extension module 182 (as the case maybe). This information may allow their host website 140 and/or extension module 182 to improve performance with the marketplace server 160.

In various embodiments, extension modules 182 may be subject to approval by the marketplace server 160 before being allowed to become listed on the marketplace server 160. Similarly, a host website 140 requesting to provide access to the marketplace UI through its website may also require approval before being allowed to host the marketplace on their website.

Marketplace Server Relaying Communication Between the Extension Module and the Host Website As discussed above with respect to FIGS. 10 and 12, in various embodiments, the marketplace server 160 may be configured to relay communications between the host website 140 and the extension module 182. The communications may be initiated by either the host website 140 or the extension module 182.

In the case where the communication is initiated from the extension module 182, the marketplace server 160 may receive the communication destined for the host website 140, and relay the communication to the host website 140.

In some embodiments, the communication initiated from the extension module 182 may be a request for data stored on the host website (e.g., step 1005 of FIG. 10), and the marketplace server 160 may be configured to determine if the extension module is authorized to access the data. If the extension module is authorized to access the data, the marketplace server 160 may then relay the request to the host website (e.g., step 1015 of FIG. 10). The host website 140 may retrieve the data, and transmit it to the marketplace server 160, which then further transmits the requested data to the extension module 182.

In some embodiments, the communication initiated from the extension module 182 may include connection data that allows the host website to establish a direct connection with the extension module 182.

In the case where the communication is initiated from the host website 140, the marketplace server 160 may receive the communication, destined for the extension module 182, and relay the communication to the extension module 182.

In some embodiments, the communication may be a query for data from the extension module 182 (e.g., step 1205 in FIG. 12). In some embodiments, the communication may be a query for data from all extension modules 182 associated with the host website 140. For example, since the extension module 182 may be able to provide additional content (e.g., depending on the nature of the host website 140, this content may include food reviews, recipes, weather information, coupon listings, real estate listings), the host website 140 may use this mechanism to query for data stored on the extension module 182.

Further, similar to the communication that may be initiated from the extension module 182, the host website 140 may also provide connection data to the marketplace server 160 that is to be relayed to the extension module 182. The extension module 182 may then use this connection data to establish a direct connection with the host website 140.

While the above description provides examples of the embodiments, it will be appreciated that some features and/or functions of the described embodiments are susceptible to modification without departing from the spirit and principles of operation of the described embodiments. Accordingly, what has been described above has been intended to be illustrative of the invention and non-limiting and it will be understood by persons skilled in the art that other variants and modifications may be made without departing from the scope of the invention as defined in the claims appended hereto.

The invention claimed is:

1. A method of providing access control, the method comprising:
   a memory;
   at least one processor;
   a module stored in the memory including computer instruction code that is executable by the at least one processor and structured to cause the at least one processor to be configured to:
      receive a request to access an extension module from a browsing device, the browsing device is for maintaining a browsing session with a host website, and the extension module is for extending the host website by exchanging data with the host website;
      generate a first authorization token that is associated with the browsing session;
      send, to the browsing device, the first authorization token;
      receive, at the extension module, a second authorization token from the browsing device;
      receive the second authorization token from the extension module and verify that the second authorization token matches the first authorization token;
      if verification is successful, allow the extension module to exchange data with the host website and communicate with the browsing device;
      receive, from the extension module, a request to access host website data from the host website;
      determine if the extension module is authorized to access the host website data from the host website; and
      if the extension module is authorized to access the host website data from the host website, transmit at least one credential to the extension module;
      wherein the extension module is configured to transmit the at least one credential to the host website when accessing the host website data from the host website, and
      wherein the host website provides a primary set of information, and the data exchanged by the extension module with the host website provides a secondary set of information that is related to the primary set of information.

2. The method of claim 1, wherein the computer instruction code is structured to cause the at least one processor to be further configured to:
  send, to the extension module, the first authorization token; and wherein, the verifying is performed by the extension module.

3. The method of claim 1, wherein when sending the first authorization token to the browsing device, the computer instruction code is structured to cause the at least one processor to be further configured to:
  send, to the browsing device, a resource locator for the extension module.

4. The method of claim 1, wherein the computer instruction code is structured to cause the at least one processor to be further configured to:
  send a user identifier to the extension module, wherein the user identifier is usable by the extension module to exchange data with the host website.

5. The method of claim 1, wherein the host website provides personal finance information, and wherein the data is selected from a group consisting of: a portfolio, a watchlist, a list of debit transactions, a list of credit transactions, loan information, asset information and a list of historical transactions.

6. The method of claim 1, wherein the host website provides social media information, and wherein the data is selected from a group consisting of: a name of a user, an email address of a user, a list of social media contacts, and one or more messages sent using the social media website.

7. The method of claim 1, wherein the host website provides news and opinion information, and wherein the data is selected from a group consisting of: an article, a headline, a blog entry, and a review.

8. The method of claim 1, wherein the host website provides food information, and wherein the data is selected from a group consisting of: an article, a food recipe, and a review.

9. The method of claim 1, wherein the host website provides fitness information, and wherein the data is selected from a group consisting of: an article, a workout, a blog entry, and a review.

10. The method of claim 1, wherein the host website provides travel information, and wherein the data is selected from a group consisting of: an article, a geographic location, a blog entry, and a review.

11. The method of claim 1, wherein the host website provides movie and television information, and wherein the data is selected from a group consisting of: an article, information about a movie, information about a television show, information about an actor, and a review.

12. The method of claim 1, wherein the at least one credential comprises a first data token, and wherein the computer instruction code is structured to cause the at least one processor to be further configured to:
  receive a second data token from the host website;
  verify that the second data token matches the first data token; and
  if verification is successful, send a data descriptor for the host website data to the host website, and upon receiving the data descriptor, the host website transmits the host website data to the extension module.

13. The method of claim 1, wherein the computer instruction code is structured to cause the at least one processor to be further configured to:
  receive, from the host website, a communication destined for the extension module; and
  relay the communication to the extension module.

14. The method of claim 13, wherein the communication comprises a request to access extension module data from the extension module, and wherein the computer instruction code is structured to cause the at least one processor to be further configured to:
  determine if the host website is authorized to access the extension module data; and
  if the host website is authorized to access the extension module data, relay the request to the extension module.

15. The method of claim 14, further comprising:
  receiving the extension module data from the extension module; and
  transmitting the extension module data to the host website.

* * * * *